(12) United States Patent
Cho et al.

(10) Patent No.: US 12,073,595 B2
(45) Date of Patent: Aug. 27, 2024

(54) AI ENCODING APPARATUS AND OPERATION METHOD OF THE SAME, AND AI DECODING APPARATUS AND OPERATION METHOD OF THE SAME

(71) Applicant: SAMSUNG ELECTRONICS CO., LTD., Suwon-si (KR)

(72) Inventors: Daesung Cho, Suwon-si (KR); Daeeun Kim, Suwon-si (KR); Bongjoe Kim, Suwon-si (KR); Taejun Park, Suwon-si (KR); Sangjo Lee, Suwon-si (KR); Kyuha Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 361 days.

(21) Appl. No.: 17/522,579

(22) Filed: Nov. 9, 2021

(65) Prior Publication Data

US 2022/0180568 A1    Jun. 9, 2022

Related U.S. Application Data

(63) Continuation of application No. PCT/KR2021/013814, filed on Oct. 7, 2021.

(30) Foreign Application Priority Data

Dec. 9, 2020    (KR) .................. 10-2020-0171373

(51) Int. Cl.
*G06N 3/045* (2023.01)
*G06T 3/4046* (2024.01)
(Continued)

(52) U.S. Cl.
CPC ............. *G06T 9/002* (2013.01); *G06N 3/045* (2023.01); *G06T 3/4046* (2013.01); *G06T 7/0002* (2013.01)

(58) Field of Classification Search
CPC ........ G06N 3/045; G06N 3/08; G06T 3/4046; G06T 9/002; G06T 2207/20081; G06T 3/40; G06V 10/82
See application file for complete search history.

(56) References Cited

U.S. PATENT DOCUMENTS 10,817,985 B2    10/2020 Kim et al.
10,825,141 B1    11/2020 Park et al.
(Continued)

FOREIGN PATENT DOCUMENTS

KR    10-2018-0108288 A    10/2018
KR       10-2022648 B1     9/2019
(Continued)

OTHER PUBLICATIONS

US 11,138,691 B2, 10/2021, Park et al. (withdrawn)
(Continued)

*Primary Examiner* — Li Liu
(74) *Attorney, Agent, or Firm* — Sughrue Mion, PLLC

(57) ABSTRACT

An artificial intelligence (AI) encoding apparatus includes at least one processor configured to: determine a downscaling target, based on a target resolution for a first image, obtain the first image by AI-downscaling an original image using an AI-downscaling neural network corresponding to the downscaling target, generate image data by encoding the first image, select AI-upscaling neural network set identification information, based on the target resolution of the first image, characteristic information of the original image, and a target detail intensity, generate AI data including the target resolution of the first image, bit depth information of the first image, the AI-upscaling neural network set identification information, and encoding control information, and generate AI encoding data including the image data and the AI data; and a communication interface configured to transmit the AI encoding data to an AI decoding apparatus, wherein the AI (Continued)

data includes information about an AI-upscaling neural network corresponding to the AI-downscaling neural network.

14 Claims, 15 Drawing Sheets

(51) Int. Cl.
  *G06T 7/00* (2017.01)
  *G06T 9/00* (2006.01)

(56) References Cited

U.S. PATENT DOCUMENTS

| | | | |
|---|---|---|---|
| 11,095,925 | B2 | 8/2021 | Jang |
| 11,388,465 | B2 | 7/2022 | Park et al. |
| 2015/0365676 | A1* | 12/2015 | Choi .................. H04N 21/435 375/240.02 |
| 2017/0347061 | A1 | 11/2017 | Wang et al. |
| 2019/0075301 | A1 | 3/2019 | Chou et al. |
| 2020/0260093 | A1* | 8/2020 | Park .................... H04N 19/172 |
| 2020/0311870 | A1 | 10/2020 | Jung et al. |
| 2020/0396440 | A1* | 12/2020 | Chen ........................ G06T 5/50 |

FOREIGN PATENT DOCUMENTS

| | | |
|---|---|---|
| KR | 10-2019-0130479 A | 11/2019 |
| KR | 10-2020-0044665 A | 4/2020 |
| KR | 10-2020-0114436 A | 10/2020 |
| WO | 2017009205 A1 | 1/2017 |
| WO | 2020/080751 A1 | 4/2020 |

OTHER PUBLICATIONS

International Search Report and Written Opinion issued Jan. 17, 2022 in International Patent Application No. PCT/KR2021/013814. (PCT/ISA/220-PCT/ISA/210-PCT/ISA/237).
"Registration Authority", IEEE SA—MA-L, 6 pages total, 2021, https://standards.ieee.org/products-services/regauth/oui/index.html.
"Akamai's [state of the internet] / security", akamai, Q1 2017 report, vol. 4, No. 1, 26 pages total, 2017, https://www.akamai.com/us/en/multimedia/documents/state-of-the-internet/q1-2017-state-of-the-internet-connectivity-report.pdf.
"High Efficiency Video Coding", Wikipedia, 22 pages total, 2021, https://en.wikipedia.org/wiki/High_Efficiency_Video_Coding.
Alex Krizhevsky et al., "ImageNet Classification with Deep Convolutional Neural Networks", 9 pages total, 2012.
Christian Szegedy et al., "Going Deeper with Convolutions", Computer Vision Foundation, 9 pages total, 2015.
Chao Dong et al., "Image Super-Resolution Using Deep Convolutional Networks", IEEE, arXiv:1501.00092v3, 14 pages total, 2000.
Chao Dong et al., "Compression Artifacts Reduction by a Deep Convolutional Network", Computer Vision Foundation, 9 pages total, 2000.
"Autoencoder", Wikipedia, 5 pages total, 2021, https://en.wikipedia.org/wiki/Autoencoder.
"Reference software for ITU-T H.265 high efficiency video coding", Series H: Audiovisual and Multimedia Systems, Infrastructure of audiovisual services—Coding of moving video, Telecommunication Standardization Sector of ITU, H.265.2, 12 pages total, Dec. 2016.
Peter de Rivaz et al., "AV1 Bitstream & Decoding Process Specification", The Alliance for Open Media, 681 pages total, 2018.
"Advanced video coding for generic audiovisual services", Series H: Audiovisual and Multimedia Systems, Infrastructure of audiovisual services—Coding of moving video, Telecommunication Standardization Sector of ITU, International Telecommunication Union, H.264, 282 pages total, May 2003.
Paul Wilkins et al., "VP9 Bitstream finalization update", WebM Project, WebM Discussion, 1 page total, May 2013.
Jan Ozer, "What Is HLS (HTTP Live Streaming)?", Streaming media, 6 pages total, Oct. 2011.
"Dynamic Adaptive Streaming over HTTP", Wikipedia, 7 pages total, 2021, https://en.wikipedia.org/wiki/Dynamic_Adaptive_Streaming_over_HTTP.
"A DTV Profile for Uncompressed High Speed Digital Interfaces", CTA-861-G, CTA Standard, Consumer Technology Association, 430 pages total, Nov. 2016.
"Information technology—Coding of audio-visual objects—", Part 12: ISO base media file format, International Standard, ISO/IEC 14496-12, 94 pages total, 2005.
"High-Definition Multimedia Interface", Specification Version 2.0, HDMI Forum, 245 pages total, Sep. 4, 2013.
"High-Definition Multimedia Interface", Specification Version 1.4b, HDMI Licensing, LLC, 430 pages total, Oct. 11, 2011.
Takeshi Chujoh et al., "AHG9/AHG11: Neural network based super resolution SEI," Sharp Corporation, Joint Video Experts Team (JVET) of ITU-T SG 16 WP 3 and ISO/IEC JTC 1/SC 29, JVET-T0092-v2, 20th meeting, Oct. 7, 2020, (Total 4 pages).
Communication issued on Dec. 14, 2023 by European Patent Office in European Application No. 21903593.8.

\* cited by examiner

FIG. 10

| user_data_registered_itu_t_t35 () { | Descriptor |
|---|---|
| itu_t_t35_country_code | u(8) |
| itu_t_t35_terminal_provider_code | u(16) |
| itu_t_t35_terminal_provider_oriented_code | u(16) |
| application_version | u(8) |
| input_picture_width_in_luma | u(16) |
| input_picture_height_in_luma | u(16) |
| input_bit_depth | u(4) |
| dnn_model_update_type | u(2) |
| picture_type | u(2) |
| quantization_level | u(8) |
| up_scaling_factor | u(8) |
| cnn_model_set_index | u(16) |
| reserved | u(8) |
| } | |

FIG. 11

| user_data_registered_itu_t_t35 () { | Descriptor |
|---|---|
| itu_t_t35_country_code | u(8) |
| itu_t_t35_terminal_provider_code | u(16) |
| itu_t_t35_terminal_provider_oriented_code | u(16) |
| application_version | u(8) |
| input_picture_width_in_luma | u(16) |
| input_picture_height_in_luma | u(16) |
| input_bit_depth | u(8) |
| quantization_level | u(8) |
| dnn_model_set_index | u(16) |
| reserved_payload_size_byte | u(8) |
| for (i = 0; i < reserved_payload_size_byte; i++) { | |
| reserved_payload_byte | u(8) |
| } | |
| } | |

FIG. 13

| Byte | bit | | | | | | | |
|---|---|---|---|---|---|---|---|---|
| | 7 | 6 | 5 | 4 | 3 | 2 | 1 | 0 |
| HB0 | 1 | VSIF type code (=0x01) | | | | | | |
| HB1 | VSIF version (=0x01) | | | | | | | |
| HB2 | 0 | 0 | 0 | Length (max 27) | | | | |

↑ 1410

| | |
|---|---|
| PB00 | Check-Sum |
| PB01 | IEEE OUT, Third Octet |
| PB02 | IEEE OUT, Second Octet |
| PB03 | IEEE OUT, First Octet |
| PB04 | application_version |
| PB05 | input_picture_width_in_luma (least significant byte first) |
| PB06 | |
| PB07 | input_picture_height_in_luma (least significant byte first) |
| PB08 | |
| PB09 | input_bitrate_in_kbps (least significant byte first) |
| PB10 | |
| PB11 | |
| PB12 | |
| PB13 | input_bit_depth | cnn_model_update_type | picture_type |
| PB14 | quantization_level |
| PB15 | up_scaling_factor |
| PB16 | dnn_model_set_index (least significant byte first) |
| PB17 | |
| PB18..PB27 | reserved |

| Byte | bit 7 | 6 | 5 | 4 | 3 | 2 | 1 | 0 |
|---|---|---|---|---|---|---|---|---|
| HB0 | 1 | | | VSIF type code (=0x01) | | | | |
| HB1 | | | | VSIF version (=0x01) | | | | |
| HB2 | 0 | 0 | 0 | Length (max 27) | | | | |

1415

| PB00 | Check-Sum |
| PB01 | IEEE 24bit code (least significant byte first) |
| PB02 | (OUI to be defined) |
| PB03 | |
| PB04 | application_version |
| PB05 | input_picture_width_in_luma (least significant byte first) |
| PB06 | |
| PB07 | input_picture_height_in_luma (least significant byte first) |
| PB08 | |
| PB09 | input_bit_depth |
| PB10 | quantization_level |
| PB11 | dnn_model_set_index (least significant byte first) |
| PB12 | |
| PB13 | reserved_payload_size_byte |
| PB14…PB27 | reserved_payload |

1425

AI ENCODING APPARATUS AND OPERATION METHOD OF THE SAME, AND AI DECODING APPARATUS AND OPERATION METHOD OF THE SAME

CROSS-REFERENCE TO RELATED APPLICATION(S)

This application is a bypass continuation application of International Application No. PCT/KR2021/013814 filed Oct. 7, 2021, which claims priority from Korean Patent Application No. 10-2020-0171373 filed on Dec. 9, 2020, the entire contents of each of which being herein incorporated by reference in their entireties.

TECHNICAL FIELD

The disclosure relates to an artificial intelligence (AI) encoding apparatus, an operation method of the AI encoding apparatus, an AI decoding apparatus, and an operation method of the AI decoding apparatus. More particularly, the disclosure relates to an AI encoding apparatus capable of AI-downscaling and encoding an original image and transmitting a result of the AI downscaling and the encoding to an AI decoding apparatus, an operation method of the AI encoding apparatus, an AI decoding apparatus capable of decoding and AI-upscaling an image received from an AI encoding apparatus, and an operation method of the AI decoding apparatus.

DESCRIPTION OF RELATED ART

An image may be encoded by using a codec following a designated data compression standard, e.g., a moving picture expert group (MPEG) compression standard, and may then be stored in a recording medium or transmitted in the form of a bitstream using a communication channel.

As hardware for reproducing and storing high-resolution/high-quality images has been developed and supplied, a need for a codec capable of effectively encoding and decoding high-resolution/high-quality images has increased.

SUMMARY

Provided are an artificial intelligence (AI) encoding apparatus capable of AI-downscaling an image and transmitting AI data necessary for AI upscaling and encoded image data to an AI decoding apparatus, and an operation method of the AI encoding apparatus.

In addition, provided are an AI decoding apparatus capable of receiving image data and AI data from an AI encoding apparatus, decoding the image data, and AI-upscaling a decoded image by using an upscaling neural network model corresponding to the AI data, and an operation method of the AI decoding apparatus.

In accordance with an aspect of the disclosure, an artificial intelligence (AI) encoding apparatus includes at least one processor configured to: determine a downscaling target, based on a target resolution for a first image, obtain the first image by AI-downscaling an original image using an AI-downscaling neural network corresponding to the downscaling target, generate image data by encoding the first image, select AI-upscaling neural network set identification information, based on the target resolution of the first image, characteristic information of the original image, and a target detail intensity, generate AI data including the target resolution of the first image, bit depth information of the first image, the AI-upscaling neural network set identification information, and encoding control information, and generate AI encoding data including the image data and the AI data; and a communication interface configured to transmit the AI encoding data to an AI decoding apparatus, wherein the AI data includes information about an AI-upscaling neural network corresponding to the AI-downscaling neural network.

The at least one processor may be further configured to determine quality information of the original image by using a quality measurement network, and determine the target detail intensity according to the quality information of the original image.

The quality information may indicate at least one of a high quality, a low quality, or a noisy quality, and the quality measurement network may be configured to extract a feature representing at least one of a detail, noise, or contrast of the original image, and determine the quality information based on the extracted feature.

The AI data may further include decoding control information including an updating method of the AI-upscaling neural network and an AI upscaling ratio.

The encoding control information may include at least one of a quantization level or a picture type, the quantization level may be determined as a preset first value, and the picture type may be determined as an intra (I) picture, a predictive (P) picture, or a bidirectional (B) picture.

The AI encoding data may include a metadata box and a media data box, the AI data may be included in the metadata box, and the image data may be included in the media data box.

The AI data may be included in supplemental enhancement information (SEI) that is an additional information area of the image data.

In accordance with an aspect of the disclosure, an AI decoding apparatus includes a communication interface configured to receive AI encoding data generated by AI-downscaling and encoding an original image; and at least one processor configured to: divide the AI encoding data into image data and AI data, obtain a second image corresponding to a first image obtained by AI-downscaling the original image, by decoding the image data, extract a resolution of the first image, bit depth information of the first image, AI-upscaling neural network set identification information, and first encoding control information from the AI data, obtain second encoding control information used to encode the first image, update the first encoding control information based on the second encoding control information, select an AI-upscaling neural network, based on a resolution of the original image, bit depth information of the original image, the AI-upscaling neural network set identification information, and the second encoding control information, and AI-upscale the second image using the selected AI-upscaling neural network.

The first encoding control information may include an initial value of a preset quantization level, and the second encoding control information may include a quantization level value applied to encode the first image.

The at least one processor may be further configured to: select a piece of neural network setting information from among a plurality of pieces of neural network setting information corresponding to the AI-upscaling neural network set identification information, according to the resolution of the first image, the bit depth information of the first image, and the quantization level value included in the second encoding control information, and set parameters of the AI-upscaling neural network using the selected piece of neural network setting information.

The at least one processor may be further configured to: determine update information of the AI-upscaling neural network and an upsampling ratio from the AI data, and AI-upscale the second image, based on the selected AI-upscaling neural network, the update information, and the upsampling ratio.

In accordance with an aspect of the disclosure, an operation method of an AI encoding apparatus includes determining a downscaling target, based on a target resolution for a first image; obtaining the first image by AI-downscaling an original image using an AI-downscaling neural network corresponding to the downscaling target; generating image data by encoding the first image; selecting AI-upscaling neural network set identification information, based on the target resolution of the first image, characteristic information of the original image, and a target detail intensity; generating AI data including the target resolution of the first image, bit depth information of the first image, the AI-upscaling neural network set identification information, and encoding control information; generating AI encoding data including the image data and the AI data; and transmitting the AI encoding data to an AI decoding apparatus, wherein the AI data represents information about an AI-upscaling neural network corresponding to the AI-downscaling neural network.

The operation method may further include determining quality information of the original image using a quality measurement network; and determining the target detail intensity according to the quality information of the original image.

The quality information may indicate at least one of a high quality, a low quality, or a noisy quality, and the quality measurement network may be configured to extract a feature representing at least one of a detail, noise, or contrast of the original image, and determine the quality information based on the extracted feature.

The AI data may further include decoding control information including an updating method of the AI-upscaling neural network and an AI upscaling ratio.

The encoding control information may include at least one of a quantization level or a picture type, the quantization level may be determined as a preset first value, and the picture type may be determined as an intra (I) picture, a predictive (P) picture, or a bidirectional (B) picture.

In accordance with an aspect of the disclosure, an operation method of an AI decoding apparatus includes receiving AI encoding data generated by AI-downscaling and encoding an original image; dividing the AI encoding data into image data and AI data; obtaining, by decoding the image data, a second image corresponding to a first image obtained by AI-downscaling the original image; extracting a resolution of the first image, bit depth information of the first image, AI-upscaling neural network set identification information, and first encoding control information from the AI data; obtaining second encoding control information used to encode the first image, and updating the first encoding control information based on the second encoding control information; selecting an AI-upscaling neural network, based on the resolution of the first image, bit depth information of the first image, the AI-upscaling neural network set identification information, and the second encoding control information; and AI-upscaling the second image by using the selected AI-upscaling neural network.

The first encoding control information may include an initial value of a preset quantization level, and the second encoding control information may include a quantization level value applied to encode the first image.

The determining of the AI-upscaling neural network may include selecting a piece of neural network setting information from among a plurality of pieces of neural network setting information corresponding to the AI-upscaling neural network set identification information, according to the resolution of the first image, the bit depth information of the first image, and the quantization level value included in the second encoding control information; and setting parameters of the AI-upscaling neural network using the selected piece of neural network setting information.

The operation method may further include determining update information of the AI-upscaling neural network and an upsampling ratio from the AI data, and the AI-upscaling of the second image may include AI-upscaling the second image, based on the selected AI-upscaling neural network, the update information, and the upsampling ratio.

BRIEF DESCRIPTION OF DRAWINGS

FIG. 10 is a syntax table of AI data according to an embodiment.

FIG. 11 is a syntax table of AI data according to another embodiment.

FIG. 13 illustrates a header structure and a content structure of a Vendor Specific Infoframe (VSIF) packet, according to an embodiment.

FIG. 14 illustrates a header structure and a content structure of a VSIF packet, according to another embodiment.

DETAILED DESCRIPTION

Figure 1:
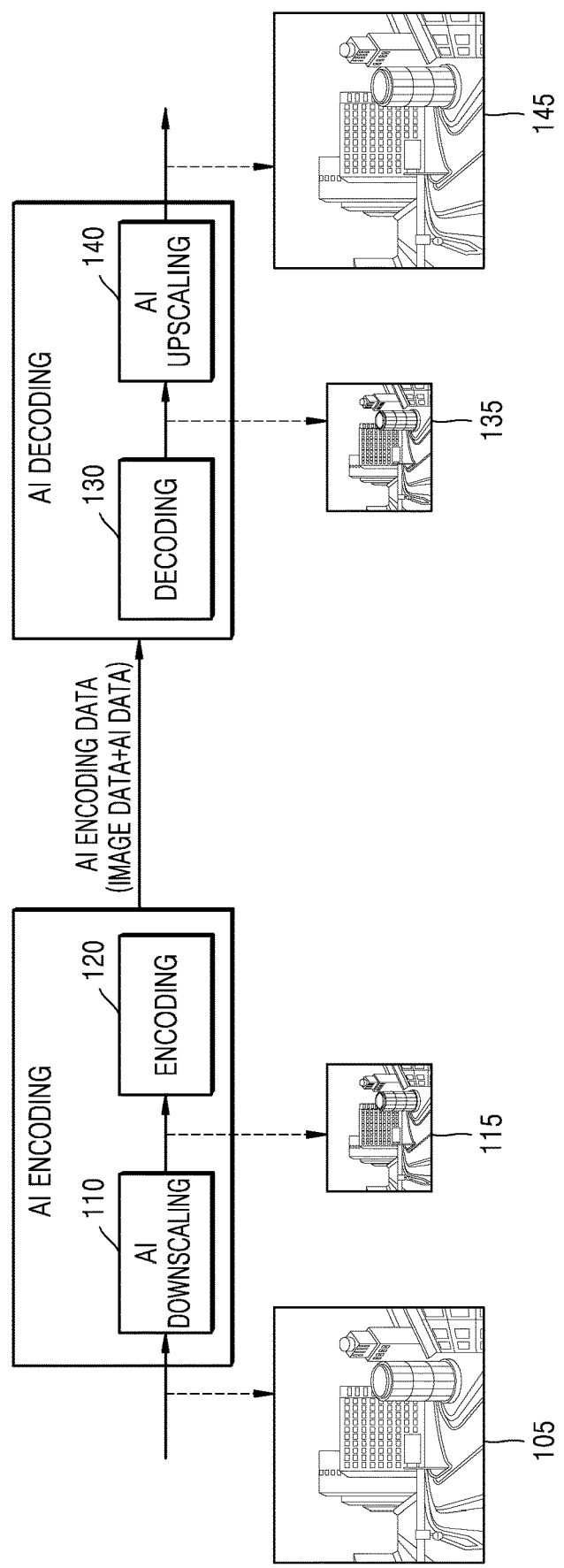
FIG. 1 is a diagram for describing an artificial intelligence (AI) encoding process and an AI decoding process, according to an embodiment.

Throughout the disclosure, the expression "at least one of a, b or c" indicates only a, only b, only c, both a and b, both a and c, both b and c, or all of a, b, and c.

As the disclosure allows for various changes and numerous examples, particular embodiments will be illustrated in the drawings and described in detail in the written description. However, this is not intended to limit the disclosure to particular modes of practice, and it will be understood that all changes, equivalents, and substitutes that do not depart from the spirit and technical scope of the disclosure are encompassed in the disclosure.

In the description of embodiments, certain detailed explanations of related art are omitted when it is deemed that they may unnecessarily obscure the essence of the disclosure. Also, numbers (for example, a first, a second, and the like) used in the description of the specification are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, embodiments may be described and illustrated in terms of blocks which carry out a described function or functions. These blocks, which may be referred to herein as "units" or "modules" or the like, or by names such as driver, controller, device, or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an 'image' or a 'picture' may denote a still image, a moving image including a plurality of consecutive still images (or frames), or a video.

Also, in the present specification, a deep neural network (DNN) is a representative example of an artificial neural network model simulating brain nerves or brain-like nerves, and is not limited to an artificial neural network model using a specific algorithm.

Also, in the present specification, a 'parameter' is a value used in an operation process of each layer forming a neural network, and for example, may include a weight used when an input value is applied to a certain operation expression. Here, the parameter may be expressed in a matrix form. The parameter is a value set as a result of training, and may be updated through separate training data when necessary.

Also, in the present specification, a 'first DNN' indicates a DNN used for artificial intelligence (AI) downscaling an image, and a 'second DNN' indicates a DNN used for AI upscaling an image.

Also, in the present specification, 'DNN setting information' includes the parameter described above as information related to the element constituting the DNN. The first DNN or the second DNN may be set by using the DNN setting information.

Also, in the present specification, an 'original image' denotes an image that is an object of AI encoding, and a 'first image' denotes an image obtained as a result of performing AI downscaling on the original image during an AI encoding process. A 'second image' denotes an image obtained through decoding during an AI decoding process, and a 'third image' denotes an image obtained by AI upscaling the second image during the AI decoding process.

Also, in the present specification, 'AI downscale' or 'AI downscaling' denotes a process of decreasing resolution of an image, based on AI, and 'encoding' denotes an encoding process according to an image compression method based on frequency transformation. Also, 'first decoding' denotes a decoding process according to an image reconstruction method based on frequency transformation, and 'AI upscale' or 'AI upscaling' denotes a process of increasing resolution of an image, based on AI.

FIG. 1 is a diagram for describing an AI encoding process and an AI decoding process, according to an embodiment of the disclosure.

As described above, when resolution of an image significantly increases, the throughput of information for encoding/decoding the image is increased, and accordingly, a method for improving efficiency of encoding and decoding of an image is desired.

As shown in FIG. 1, according to an embodiment of the disclosure, a first image 115 is obtained by performing AI downscaling 110 on an original image 105 having high resolution. Then, encoding 120 and decoding 130 are performed on the first image 115 having relatively low resolution, and thus a bitrate may be greatly reduced compared to when the encoding 120 and the decoding 130 are performed on the original image 105.

For example, referring to FIG. 1, the first image 115 is obtained by performing the AI downscaling 110 on the original image 105 and the encoding 120 is performed on the first image 115, during the AI encoding process, according to an embodiment of the disclosure. During the AI decoding process, AI encoding data including AI data and image data, which are obtained as a result of AI encoding, is received, a second image 135 is obtained using the decoding 130, and a third image 145 is obtained by performing AI upscaling 140 on the second image 135.

Referring to an example AI encoding process, when the original image 105 is received, the AI downscaling 110 is performed on the original image 105 to obtain the first image 115 of certain resolution and/or certain quality. The AI downscaling 110 is performed based on AI, and AI for the AI downscaling 110 may be trained jointly with AI for the AI upscaling 140 with respect to the second image 135. This is because, when the AI for the AI downscaling 110 and the AI for the AI upscaling 140 are separately trained, a difference between the original image 105, which is an object of AI encoding, and the third image 145 reconstructed through AI decoding is increased.

According to an embodiment of the disclosure, the AI data may be used to maintain such a joint relationship during the AI encoding process and the AI decoding process. Accordingly, the AI data obtained through the AI encoding process may include information indicating an upscaling target, and, during the AI decoding process, the AI upscaling 140 may be performed on the second image 135 according to the upscaling target verified based on the AI data.

The AI for the AI downscaling 110 and the AI for the AI upscaling 140 may be embodied as a DNN. For convenience of explanation, a DNN used for the AI downscaling 110 will be referred to as a first DNN, and a DNN used for the AI upscaling 140 will be referred to as a second DNN. As will be described later with reference to FIGS. 2 and 3, because a first DNN and a second DNN are jointly trained by sharing loss information under a certain target, an AI encoding apparatus may provide target information used during joint training of the first DNN and the second DNN to an AI decoding apparatus, and the AI decoding apparatus may perform the AI upscaling 140 on the second image 135 to target quality and/or resolution based on the received target information.

Regarding the encoding 120 and the decoding 130 of FIG. 1, information amount of the first image 115 obtained by performing the AI downscaling 110 on the original image 105 may be reduced through the encoding 120. The encoding 120 may include a process of generating prediction data by predicting the first image 115, a process of generating residual data corresponding to a difference between the first image 115 and the prediction data, a process of transforming the residual data of a spatial domain component to a frequency domain component, a process of quantizing the residual data transformed to the frequency domain component, and a process of entropy-encoding the quantized residual data. Such encoding 120 may be performed using one of image compression methods using frequency transformation, such as MPEG-2, H.264 Advanced Video Coding (AVC), MPEG-4, High Efficiency Video Coding (HEVC), VC-1, VP8, VP9, and AOMedia Video 1 (AV1).

The second image 135 corresponding to the first image 115 may be reconstructed by performing the decoding 130 on the image data. The decoding 130 may include a process of generating the quantized residual data by entropy-decoding the image data, a process of inverse-quantizing the quantized residual data, a process of transforming the residual data of the frequency domain component to the spatial domain component, a process of generating the prediction data, and a process of reconstructing the second image 135 by using the prediction data and the residual data. Such decoding 130 may be performed using an image reconstruction method corresponding to one of the image compression methods using frequency transformation, such as MPEG-2, H.264 AVC, MPEG-4, HEVC, VC-1, VP8, VP9, and AV1, which is used in the encoding 120.

The AI encoding data obtained through the AI encoding process may include the image data obtained as a result of performing the encoding 120 on the first image 115, and the AI data related to the AI upscaling 140 on the second image 135. The image data may be used during the decoding 130 and the AI data may be used during the AI upscaling 140.

The image data may be transmitted in a form of a bitstream. The image data may include data obtained based on pixel values in the first image 115, for example, residual data that is a difference between the first image 115 and prediction data of the first image 115. Also, the image data includes pieces of information used during the encoding 120 on the first image 115. For example, the image data may include prediction mode information, motion information, and quantization parameter-related information used during the encoding 120. The image data may be generated according to a rule, for example, according to a syntax, of an image compression method used during the encoding 120, from among the image compression methods using frequency transformation, such as MPEG-2, H.264 AVC, MPEG-4, HEVC, VC-1, VP8, VP9, and AV1.

The AI data is used in the AI upscaling 140 based on the second DNN. As described above, because the first DNN and the second DNN are jointly trained, the AI data includes information enabling the AI upscaling 140 to be performed accurately on the second image 135 through the second DNN. During the AI decoding process, the AI upscaling 140 may be performed on the second image 135 to have targeted resolution and/or quality, based on the AI data.

The AI data may be transmitted together with the image data in the form of a bitstream. According to an embodiment, the AI data may be transmitted separately from the image data, in a form of a frame or a packet. Alternatively, according to an embodiment, the AI data may be included in the image data and transmitted. The image data and the AI data may be transmitted through the same network or different networks.

A method of jointly training the first DNN and the second DNN will now be described with reference to FIG. 2.

Figure 2:
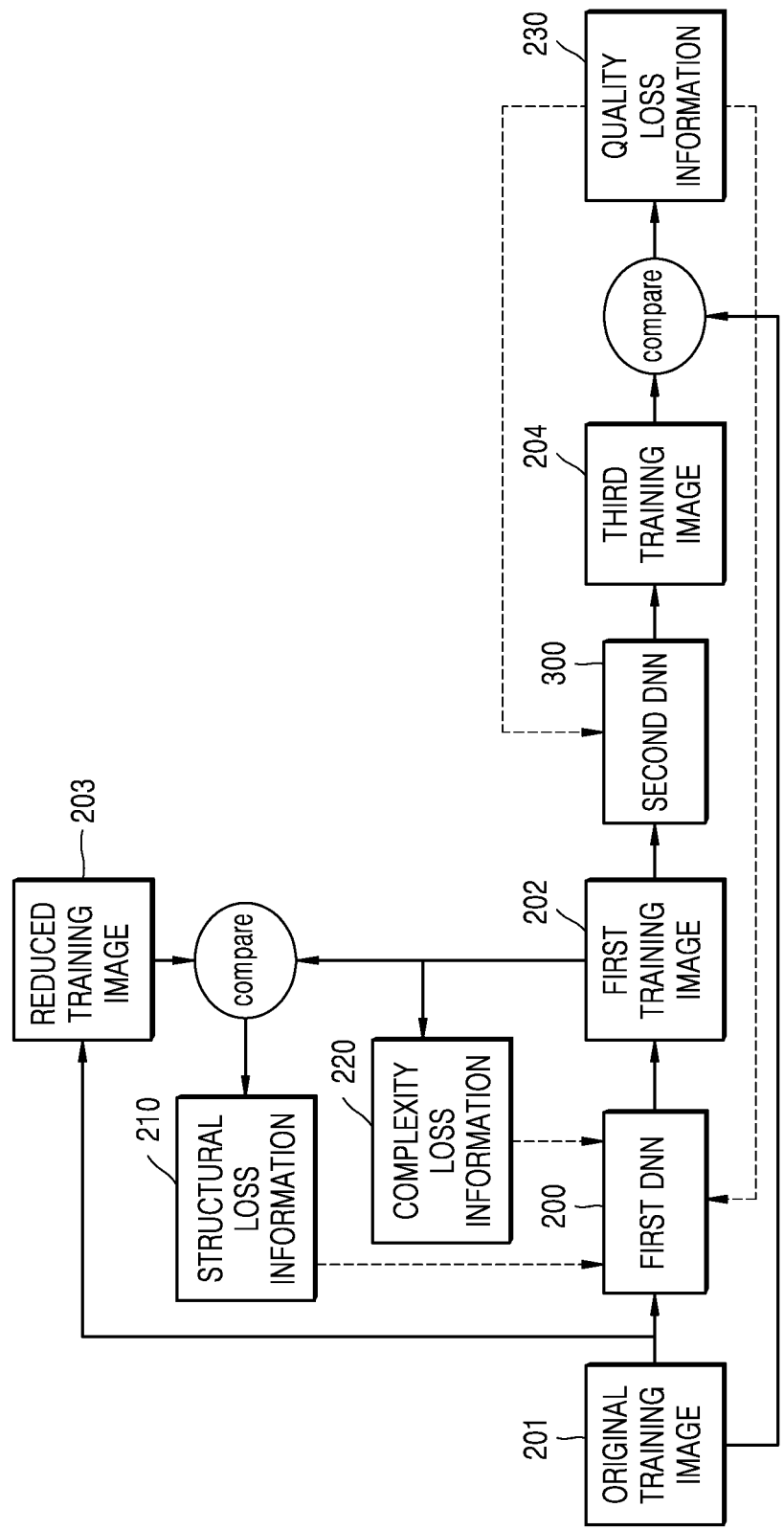
FIG. 2 is a diagram for describing a method of training a first deep neural network (DNN) and a second DNN, according to an embodiment.

FIG. 2 is a diagram for describing a method of training a first DNN 200 and a second DNN 300, according to an embodiment of the disclosure.

According to an embodiment, the original image 105 on which AI encoding is performed through an AI encoding process is reconstructed to the third image 145 using an AI decoding process, and, in order to maintain similarity between the third image 145 obtained as a result of AI decoding and the original image 105, connectivity between the AI encoding process and the AI decoding process is desirable. In other words, information lost in the AI encoding process may be reconstructed during the AI decoding process, and, to this end, the first DNN 200, which may be the DNN used for AI downscaling, and the second DNN 300, which may be DNN used for AI upscaling, may be jointly trained.

For accurate AI decoding, ultimately, quality loss information 230 corresponding to a result of comparing a third training image 204 and an original training image 201 shown in FIG. 2 may be reduced. Accordingly, the quality loss information 230 is used to train both the first DNN 200 and the second DNN 300.

First, a training process shown in FIG. 2 will be described.

In FIG. 2, the original training image 201 is an image on which AI downscaling is to be performed, and a first training image 202 is an image obtained by performing AI downscaling on the original training image 201. Also, the third training image 204 is an image obtained by performing AI upscaling on the first training image 202.

The original training image 201 includes a still image or a moving image including a plurality of frames. According to an embodiment, the original training image 201 may include a luminance image extracted from the still image or the moving image including the plurality of frames. According to an embodiment, the original training image 201 may include a patch image extracted from the still image or the moving image including the plurality of frames. When the original training image 201 includes the plurality of frames, the first training image 202 and the third training image 204 also each include a plurality of frames. When the plurality of frames of the original training image 201 are sequentially input to the first DNN 200, the plurality of frames of the first training image 202 and the third training image 204 may be sequentially obtained through the first DNN 200 and the second DNN 300.

For joint training of the first DNN 200 and the second DNN 300, the original training image 201 is input to the first DNN 200. The original training image 201 input to the first DNN 200 is output as the first training image 202 using the AI downscaling, and the first training image 202 is input to the second DNN 300. The third training image 204 is output as a result of performing the AI upscaling on the first training image 202.

Referring to FIG. 2, the first training image 202 is input to the second DNN 300. According to an embodiment, a second training image obtained through encoding and decoding on the first training image 202 may be input to the second DNN 300. In order to input the second training image to the second DNN 300, any one codec among MPEG-2, H.264, MPEG-4, HEVC, VC-1, VP8, VP9, and AV1 may be used. For example, any one codec among MPEG-2, H.264, MPEG-4, HEVC, VC-1, VP8, VP9, and AV1 may be used to perform encoding on the first training image 202 and decoding on image data corresponding to the first training image 202.

Referring to FIG. 2, separate from the first training image 202 being output through the first DNN 200, a reduced training image 203 is obtained by performing legacy downscaling on the original training image 201. Here, the legacy downscaling may include at least one of bilinear scaling, bicubic scaling, lanczos scaling, or stair step scaling.

In order to prevent a structural feature of the first image 115 from deviating greatly from a structural feature of the original image 105, the reduced training image 203 is obtained to preserve the structural feature of the original training image 201.

Before training is performed, the first DNN 200 and the second DNN 300 may be set with pre-determined DNN setting information. When the training is performed, structural loss information 210, complexity loss information 220, and the quality loss information 230 may be determined.

The structural loss information 210 may be determined based on a result of comparing the reduced training image 203 and the first training image 202. For example, the structural loss information 210 may correspond to a difference between structural information of the reduced training image 203 and structural information of the first training image 202. Structural information may include various features extractable from an image, such as luminance, contrast, histogram, or the like of the image. The structural loss information 210 indicates how much structural information of the original training image 201 is maintained in the first training image 202. When the structural loss information 210 is small, the structural information of the first training image 202 is similar to the structural information of the original training image 201.

The complexity loss information 220 may be determined based on spatial complexity of the first training image 202. For example, a total variance value of the first training image 202 may be used as the spatial complexity. The complexity loss information 220 is related to a bitrate of image data obtained by performing first encoding on the first training image 202. The bitrate of the image data is low when the complexity loss information 220 is small.

The quality loss information 230 may be determined based on a result of comparing the original training image 201 with the third training image 204. The quality loss information 230 may include at least one of an L1-norm value, an L2-norm value, an Structural Similarity (SSIM) value, a Peak Signal-To-Noise Ratio-Human Vision System (PSNR-HVS) value, an Multiscale SSIM (MS-SSIM) value, a Variance Inflation Factor (VIF) value, or a Video Multi-method Assessment Fusion (VMAF) value regarding the difference between the original training image 201 and the third training image 204. The quality loss information 230 indicates how much the third training image 204 is similar to the original training image 201. The third training image 204 is more similar to the original training image 201 when the quality loss information 230 is small.

Referring to FIG. 2, the structural loss information 210, the complexity loss information 220, and the quality loss information 230 are used to train the first DNN 200, and the quality loss information 230 is used to train the second DNN 300. In other words, the quality loss information 230 is used to train both the first and second DNNs 200 and 300.

The first DNN 200 may update a parameter such that final loss information determined based on the structural loss information 210, the complexity loss information 220, and the quality loss information 230 is reduced or minimized. Also, the second DNN 300 may update a parameter such that the quality loss information 230 is reduced or minimized.

The final loss information for training the first DNN 200 and the second DNN 300 may be determined as Equation 1 below.

$$\text{LossDS} = a*\text{STRUCTURAL LOSS INFORMATION} + b*\text{COMPLEXITY LOSS INFORMATION} + c*\text{QUALITY LOSS INFORMATION}$$

$$\text{LossUS} = d*\text{QUALITY LOSS INFORMATION} \quad \text{[Equation 1]}$$

In Equation 1, LossDS indicates final loss information to be reduced or minimized to train the first DNN 200, and LossUS indicates final loss information to be reduced or minimized to train the second DNN 300. Also, a, b, c and d may correspond to pre-determined weights.

In other words, the first DNN 200 updates parameters in a direction where LossDS of Equation 1 is reduced, and the second DNN 300 updates parameters in a direction where LossUS is reduced. When the parameters of the first DNN 200 are updated according to LossDS derived during the training, the first training image 202 obtained based on the updated parameters becomes different from a previous first training image 202 obtained during previous training, and accordingly, the third training image 204 also becomes different from a previous third training image 204 obtained during the previous training. When the third training image 204 becomes different from the previous third training image 204, the quality loss information 230 is also newly determined, and the second DNN 300 updates the parameters accordingly. When the quality loss information 230 is newly determined, LossDS is also newly determined, and thus the first DNN 200 updates the parameters according to the newly determined LossDS. In other words, updating of the parameters of the first DNN 200 leads to updating of the parameters of the second DNN 300, and the updating of the parameters of the second DNN 300 leads to updating of the parameters of the first DNN 200. In other words, because the first DNN 200 and the second DNN 300 are jointly trained by sharing the quality loss information 230, the parameters of the first DNN 200 and the parameters of the second DNN 300 may be jointly optimized.

Referring to Equation 1, it is verified that LossUS is determined according to the quality loss information 230, but this is only an example. LossUS may be determined based on at least one of the structural loss information 210 or the complexity loss information 220, and the quality loss information 230.

An AI encoding apparatus and an AI decoding apparatus according to an embodiment of the disclosure may store a plurality of pieces of DNN setting information. A method of training the plurality of pieces of DNN setting information stored in the AI encoding apparatus and the AI decoding apparatus will be described.

As described with reference to Equation 1, the first DNN 200 updates the parameters, based on the similarity between the structural information of the first training image 202 and the structural information of the original training image 201, represented for example as structural loss information 210, the bitrate of the image data obtained as a result of performing first encoding on the first training image 202, represented for example as complexity loss information 220, and the difference between the third training image 204 and the original training image 201, represented for example as quality loss information 230.

For example, the parameters of the first DNN 200 may be updated such that the first training image 202 having similar structural information as the original training image 201 is obtained and the image data having a small bitrate is obtained when encoding is performed on the first training image 202 and also such that the second DNN 300 performing AI upscaling on the first training image 202 may obtain the third training image 204 similar to the original training image 201.

A direction in which the parameters of the first DNN 200 are optimized varies by adjusting the weights a, b, and c of Equation 1. For example, when the weight b is determined to be high, the parameters of the first DNN 200 may be updated by prioritizing a low bitrate over the high quality of the third training image 204. Also, when the weight c is determined to be high, the parameters of the first DNN 200 may be updated by prioritizing high quality of the third training image 204 over a high bitrate or maintenance of the structural information of the original training image 201.

Also, the direction in which the parameters of the first DNN 200 are optimized may vary according to a type of codec used to perform encoding on the first training image 202. This is because the second training image to be input to the second DNN 300 may vary according to the type of codec.

In other words, the parameters of the first DNN 200 and the parameters of the second DNN 300 may be jointly updated based on the weights a, b, and c, and the type of codec for performing encoding on the first training image 202. Accordingly, when the first DNN 200 and the second DNN 300 are trained after determining the weights a, b, and c each to be a certain value and determining the type of codec to be a certain type, the parameters of the first DNN 200 and the parameters of the second DNN 300 connected and optimized to each other may be determined.

Also, when the first DNN 200 and the second DNN 300 are trained after changing the weights a, b, and c, and the type of codec, the parameters of the first DNN 200 and the parameters of the second DNN 300 connected to each other and optimized may be determined. In other words, the plurality of pieces of DNN setting information jointly trained with each other may be determined in the first DNN 200 and the second DNN 300, when the first DNN 200 and the second DNN 300 are trained while changing values of the weights a, b, and c, and the value of each type of codec.

The plurality of pieces of DNN setting information of the first DNN 200 and the second DNN 300 according to an embodiment of the disclosure may be mapped to pieces of information related to the first image 115. To set such a mapping relationship, encoding may be performed on the first training image 202 output from the first DNN 200, using a specific codec according to a specific bitrate, and the second training image obtained by performing decoding on a bitstream obtained as a result of performing the encoding may be input to the second DNN 300. In other words, a DNN setting information pair mapped to the resolution of the first training image 202, a type of the codec used to perform the encoding on the first training image 202, and the bitrate of the bitstream obtained as a result of performing the encoding on the first training image 202 may be determined by training the first DNN 200 and the second DNN 300 after setting an environment such that the encoding is performed on the first training image 202 having a specific resolution using the specific codec according to the specific bitrate. By variously changing the resolution of the first training image 202, the type of codec used to perform the encoding on the first training image 202, and the bitrate of the bitstream obtained according to the encoding of the first training image 202, the mapping relationships between the plurality of pieces of DNN setting information of the first DNN 200 and the second DNN 300 and the pieces of information related to the first image 115 may be determined.

Figure 3:
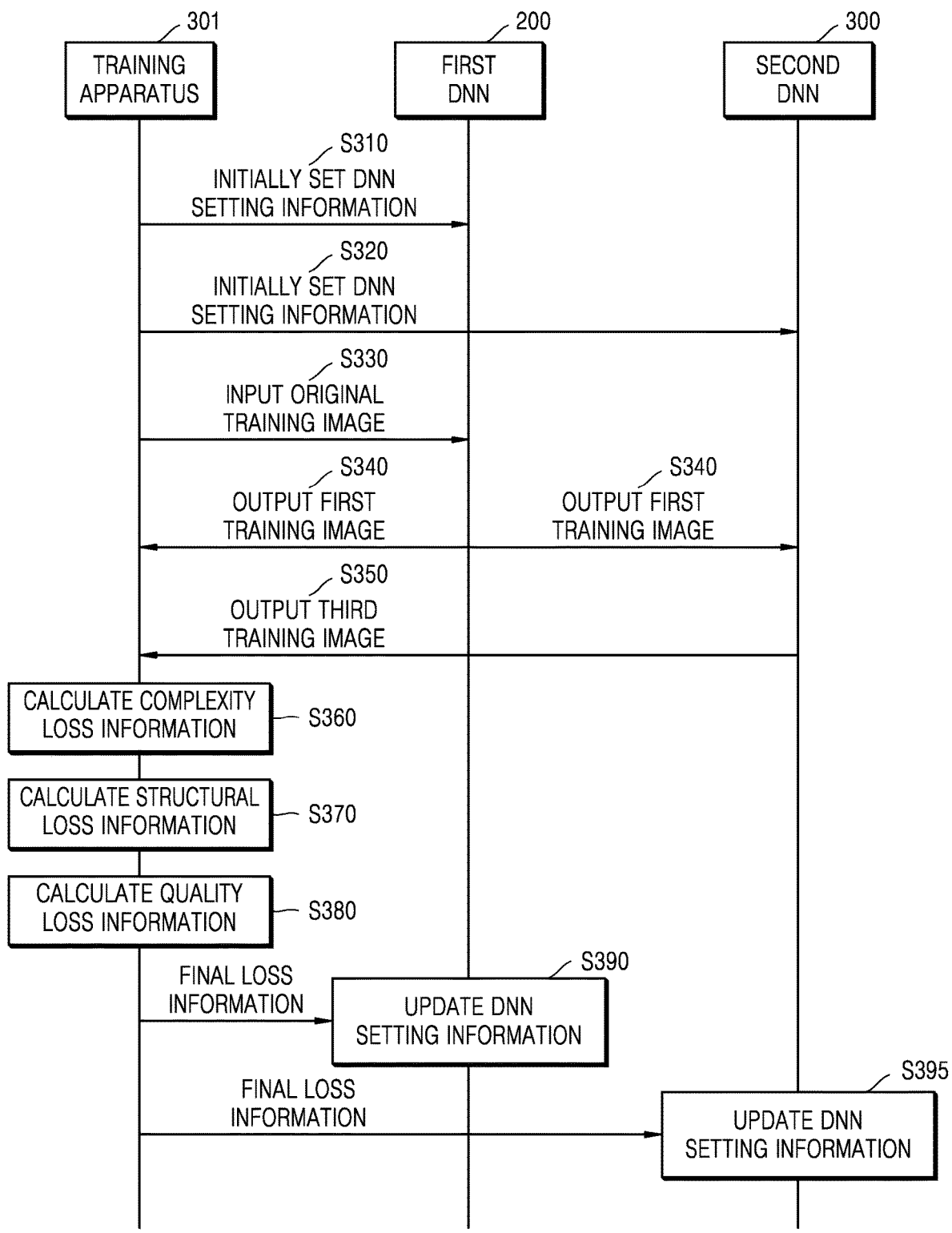
FIG. 3 is a diagram for describing a process of training the first DNN and the second DNN, according to an embodiment.

FIG. 3 is a diagram for describing a process of training the first DNN 200 and the second DNN 300, according to an embodiment of the disclosure.

The training of the first DNN 200 and the second DNN 300 described above with reference to FIG. 2 may be performed by a training apparatus 301. The training apparatus 301 includes the first DNN 200 and the second DNN 300. The training apparatus 301 may be, for example, an AI encoding apparatus or a separate server. The pieces of DNN setting information of the second DNN 300 obtained as the training result are stored in an AI decoding apparatus.

Referring to FIG. 3, the training apparatus 301 initially sets DNN setting information of the first DNN 200 and DNN setting information of the second DNN 300, in operations S310 and S320, respectively. Accordingly, the first DNN 200 and the second DNN 300 may operate according to predetermined DNN setting information. The DNN setting information may include information about at least one of the number of convolution layers included in the first DNN 200 and the second DNN 300, the number of filter kernels for each convolution layer, the size of a filter kernel for each convolution layer, or a parameter of each filter kernel.

The training apparatus 301 inputs the original training image 201 to the first DNN 200, in operation S330. The original training image 201 may include a still image or at least one frame included in a moving image.

The first DNN 200 processes the original training image 201 according to the initially set DNN setting information and outputs the first training image 202 obtained by AI-downscaling the original training image 201, in operation S340. In FIG. 3, the first training image 202 output from the first DNN 200 is directly input to the second DNN 300. However, the first training image 202 output from the first DNN 200 may be input to the second DNN 300 by the training apparatus 301. Also, the training apparatus 301 may perform encoding and decoding on the first training image 202 using a specific codec, and then input the second training image to the second DNN 300.

The second DNN 300 processes the first training image 202 or the second training image according to the initially set DNN setting information and outputs the third training image 204 obtained by AI-upscaling the first training image 202 or the second training image, in operation S350.

The training apparatus 301 calculates the complexity loss information 220, based on the first training image 202, in operation S360.

The training apparatus 301 calculates the structural loss information 210 by comparing the reduced training image 203 with the first training image 202, in operation S370.

The training apparatus 301 calculates the quality loss information 230 by comparing the original training image 201 with the third training image 204, in operation S380.

The first DNN 200 updates the initially set DNN setting information using a back propagation process based on final loss information, in operation S390. The training apparatus 301 may calculate the final loss information for training the first DNN 200, based on the complexity loss information 220, the structural loss information 210, and the quality loss information 230.

The second DNN 300 updates the initially set DNN setting information using a back propagation process based on the quality loss information 230 or the final loss information, in operation S395. The training apparatus 301 may calculate the final loss information for training the second DNN 300, based on the quality loss information 230.

Then, the training apparatus 301, the first DNN 200, and the second DNN 300 repeat operations S330 through S395 until pieces of final loss information are minimized, to update the DNN setting information. At this time, during each repetition, the first DNN 200 and the second DNN 300 operate according to the DNN setting information updated in the previous operation.

Table 1 below shows effects when AI encoding and AI decoding are performed on the original image 105 according to an embodiment of the disclosure and when encoding and decoding are performed on the original image 105 using HEVC.

TABLE 1

| Content | Resolution | Number of frames | Information amount (Bitrate) | | Subjective image quality score | |
|---|---|---|---|---|---|---|
| | | | HEVC | AI encoding/ | HEVC | AI encoding/ |
| Content_01 | 8K | 300 frames | 46.3 | 21.4 | 94.80 | 93.54 |
| Content_02 | (7680 × | | 46.3 | 21.6 | 98.05 | 98.98 |
| Content_03 | 4320) | | 46.3 | 22.7 | 96.08 | 96.00 |
| Content_04 | | | 46.1 | 22.1 | 86.26 | 92.00 |
| Content_05 | | | 45.4 | 22.7 | 93.42 | 92.98 |
| Content_06 | | | 46.3 | 23.0 | 95.99 | 95.61 |
| | | Average | 46.11 | 22.25 | 94.10 | 94.85 |

As shown in Table 1, even when a subjective quality of image when AI encoding and AI decoding are performed on content including 300 frames of 8 K resolution according to an embodiment of the disclosure is higher than a subjective quality of image when encoding and decoding are performed using HEVC, a bitrate is reduced by 50% or more.

Figure 4:
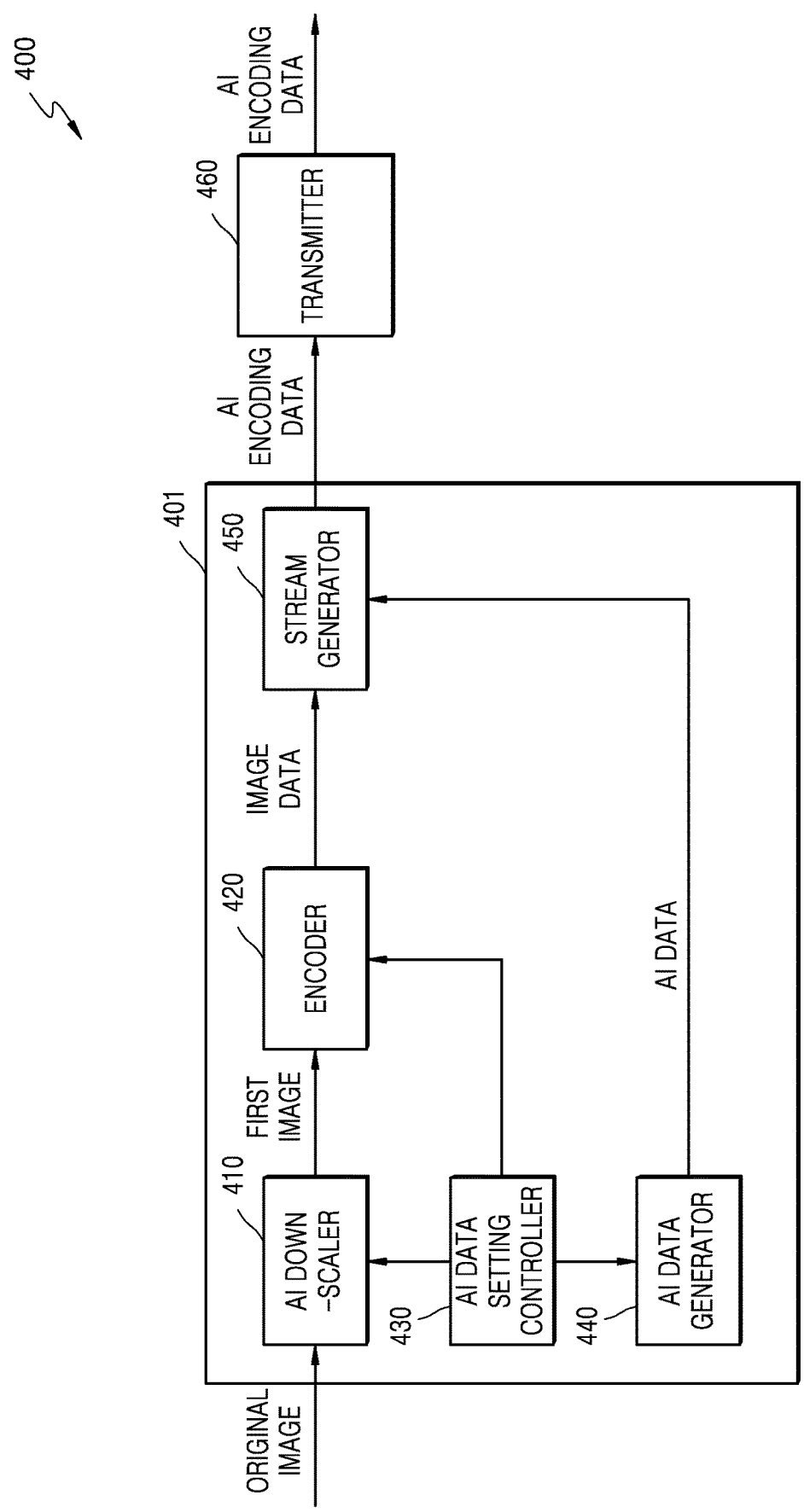
FIG. 4 is a block diagram of a structure of an AI encoding apparatus according to an embodiment.

FIG. 4 is a block diagram of a structure of an AI encoding apparatus 400 according to an embodiment of the disclosure.

Referring to FIG. 4, the AI encoding apparatus 400 may include an AI encoder 401 and a transmitter 460. The AI encoder 401 may include an AI down-scaler 410, an AI data setting controller 430, an AI data generator 440, an encoder 420, and a stream generator 450.

In FIG. 4, the AI encoder 401 and the transmitter 460 are illustrated as separate devices. However, the AI encoder 401 and the transmitter 460 may be implemented using one processor. In this case, the AI encoder 401 and the transmitter 460 may be implemented using a dedicated processor or through a combination of software and a general-purpose processor such as an application processor (AP), a central processing unit (CPU), or a graphic processing unit (GPU). The dedicated processor may include a memory for implementing an embodiment of the disclosure or may include a memory processor for using an external memory.

Also, the AI encoder 401 and the transmitter 460 may implemented using a plurality of processors. In this case, the AI encoder 401 and the transmitter 460 may be implemented using a combination of dedicated processors or through a combination of software and a plurality of general-purpose processors such as an AP, a CPU, or a GPU. According to an embodiment, the encoder 420 may be configured by a first processor, the AI data setting controller 430, the AI data generator 440, and the stream generator 450 may be implemented using a second processor different from the first processor, and the transmitter 460 may be implemented using a third processor different from the first and second processors.

The AI encoder 401 may AI-downscale the original image 105 and may encode the first image 115. The AI encoder 401 may obtain one or more pieces of input information, and may generate AI data, based on the obtained one or more pieces of input information. The AI encoder 401 transmits, to the transmitter 460, AI encoding data including image data obtained as a result of the encoding and AI data. The transmitter 460 transmits the AI encoding data to an AI decoding apparatus.

The AI down-scaler 410 may obtain the first image 115 obtained by performing the AI downscaling on the original image 105 through a first DNN. The AI down-scaler 410 may perform AI downscaling on the original image 105 by using target resolution information of the first image 115 corresponding to a downscaling target provided by the AI data setting controller 430.

The AI data setting controller 430 may determine the downscaling target of the original image 105, based on a pre-determined standard. The downscaling target indicates information indicating how much is resolution decreased from the original image 105 to obtain the first image 115. For example, the AI data setting controller 430 may determine a downscaling ratio, based on a difference between resolution of the original image 105 and target resolution information of the first image 115, and may transmit the determined down-scaling ratio to the AI down-scaler 410. The AI data setting controller 430 sets downscale target resolution of the first image 115 instead of setting resolution information of the original image 105, and uses the set downscale target resolution to determine setting information of a second DNN that is to be used in the AI upscaling 140.

In order to obtain the first image 115 matching the downscaling target, the AI down-scaler 410 may store a plurality of pieces of DNN setting information settable in the first DNN. The AI down-scaler 410 may obtain DNN setting information corresponding to the downscaling ratio from among the plurality of pieces of DNN setting information, and may set the obtained DNN setting information to the first DNN.

Each of the plurality of pieces of DNN setting information may be trained to obtain the first image 115 having pre-determined various resolutions and/or pre-determined quality. For example, any one piece of DNN setting information among the plurality of pieces of DNN setting information may include pieces of information for obtaining the first image 115 having a resolution that is one half of a resolution of the original image 105, for example, the first image 115 having a 2K resolution, for example 1920×1080, that is one half of a 4K resolution, for example 3840×2160 of the original image 105, and another piece of DNN setting information may include pieces of information for obtaining the first image 115 having a resolution that is one quarter of a resolution of the original image 105, for example, the first image 115 having a 1K resolution, for example 960×540 that is one quarter of the 4K resolution, for example 3840×2160 of the original image 105.

According to an embodiment, when pieces of information, which may be for example, the number of convolution layers, the number of filter kernels for each convolution layer, a parameter of each filter kernel, and the like, included in the DNN setting information are stored in the form of a lookup table, the AI down-scaler 410 may obtain the DNN setting information by combining some values selected from the values in the lookup table, based on the downscaling target, and set the obtained DNN setting information in the first DNN.

According to an embodiment, the AI down-scaler 410 may determine a structure of a DNN corresponding to the downscaling target, and obtain DNN setting information corresponding to the determined structure of the DNN, for example, by obtaining parameters of a filter kernel.

The plurality of pieces of DNN setting information for performing the AI downscaling on the original image 105 may have an optimized value as the first DNN and the second DNN are jointly trained. Here, each piece of DNN setting information may include at least one of the number of convolution layers included in the first DNN, the number of filter kernels for each convolution layer, or a parameter of each filter kernel.

The AI down-scaler 410 may obtain the first image 115 having a predetermined resolution and/or predetermined quality through the first DNN by setting the first DNN with the DNN setting information determined for the AI downscaling on the original image 105. When the DNN setting information for performing the AI downscaling on the original image 105 is obtained from the plurality of pieces of DNN setting information, each layer in the first DNN may process input data, based on pieces of information included in the DNN setting information.

The AI down-scaler 410 may transmit, to the encoder 420, the first image 115 obtained by performing the AI downscaling on the original image 105 through the first DNN.

Upon receiving the first image 115 from the AI downscaler 410, the encoder 420 may reduce an information amount of the first image 115 by encoding the first image 115 according to an image compression method based on frequency transformation. Image data is obtained as a result of the encoding using a predetermined codec, for example, MPEG-2, H.264 AVC, MPEG-4, HEVC, VC-1, VP8, VP9, or AV1. The image data is generated according to the rules, for example the syntax, of the predetermined codec. The image data may include data obtained based on pixel values in the first image 115, for example, residual data that is a difference between the first image 115 and prediction data of the first image 115. Also, the image data includes pieces of information used during an encoding process of the first image 115. For example, the image data may include picture type information, prediction mode information, motion information, and quantization parameter related information, for example a quantization level, which are used to encode the first image 115.

The image data obtained as a result of the encoding by the encoder 420 is provided to the stream generator 450.

The AI data setting controller 430 may obtain one or more pieces of input information. For example, referring to FIG. 5, the AI data setting controller 430 may obtain a target resolution of the first image 115, a bit depth of the first image 115, characteristic information of an original image, for example the input image, a target detail intensity, encoding control information, decoding control information, and the like.

The AI data setting controller 430 may further obtain, as input information, at least one of a target bitrate of the image data, a bitrate type of the image data, for example, a variable bitrate type, a constant bitrate type, or an average bitrate type, and a color format, for example a luminance component, chrominance component, red component, green component, or blue component, to which AI downscaling is applied, a codec type for encoding of the first image 115, or compression history information.

The one or more pieces of input information may include information pre-stored in the AI encoding apparatus 400 or information received from a user.

The AI data setting controller 430 may control an operation of the AI down-scaler 410, based on the input information. According to an embodiment, the AI data setting controller 430 may determine a downscaling target according to the input information, and may provide the determined downscaling target to the AI down-scaler 410.

According to an embodiment, the AI data setting controller 430 may transmit at least a part of the input information to the encoder 420, and thus the encoder 420 may encode the first image 115 using a bitrate of a specific value, a bitrate of a specific type, and a specific codec.

According to an embodiment, the AI data setting controller 430 may determine the downscaling target, based on at least one of a compression ratio such as a downscaling ratio, for example, a resolution difference between the original image 105 and the first image 115 or a target bitrate, a compression quality, for example, a type of bitrate, compression history information, or a type of the original image 105.

For example, the AI data setting controller 430 may determine the downscaling target, based on the compression ratio, the compression quality, or the like, which is pre-set or received from a user.

As another example, the AI data setting controller 430 may determine the downscaling target by using the compression history information stored in the AI encoding apparatus 400. For example, according to the compression history information usable by the AI encoding apparatus 400, an encoding quality, a compression ratio, or the like preferred by the user may be determined, and the downscaling target may be determined according to the encoding quality determined based on the compression history information. For example, the resolution, quality, or the like of the first image 115 may be determined according to the encoding quality that has been used most often according to the compression history information.

As another example, the AI data setting controller 430 may determine the downscaling target based on the encoding quality that has been used more frequently than a predetermined threshold value, for example an average quality of the encoding qualities that have been used more frequently than the predetermined threshold value, according to the compression history information.

As another example, the AI data setting controller 430 may determine the downscaling target, based on the resolution, type, for example a file format, or the like of the original image 105.

Figure 6:
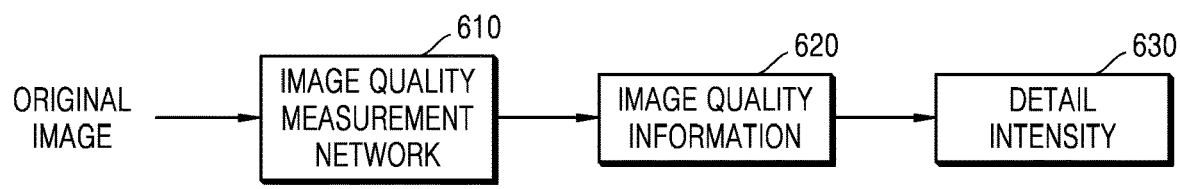

The AI data setting controller 430 may determine an image quality of the original image. For example, referring to FIG. 6, the AI data setting controller 430 may include an image quality measurement network 610, and, when an original image is input to the image quality measurement network 610, the image quality measurement network 610 may output image quality information 620. The image quality information 620 may be determined as at least one of a high quality, a low quality, or a noisy quality. The image quality measurement network 610 may extract a feature representing at least one of a detail, noise, or contrast of an input original image, and may determine the image quality information 620, based on the extracted feature. For example, when a detail level of an image is equal to or greater than a first value and noise is less than a second value, the quality of the image may be determined as a high quality. When the detail level of the image is less than the first value and noise is less than the second value, the quality of the image may be determined as a low quality. When the detail level of the image is less than the first value and noise is equal to or greater than the second value, the quality of the image may be determined as a noisy quality.

The AI data setting controller 430 may determine a target detail intensity 630, based on the determined image quality information 620. For example, when an image quality is low, the AI data setting controller 430 may determine that a target detail intensity is strong. However, embodiments are not limited thereto.

Referring back to FIG. 5, the AI data generator 440 may generate AI data, based on the input information obtained by the AI data setting controller 430. AI data according to an embodiment of the disclosure may include at least one of the target resolution of a first image, a bit depth of the first image, second DNN set identification information, a quantization level initialization value, a quantization parameter initialization value, a picture type initialization value, second DNN update information, or an upscaling ratio.

When an operation method is predefined between the AI encoding apparatus 400 and an AI decoding apparatus 700 according to an embodiment, the AI data may not include the picture type information, the second DNN update information, and the upscaling ratio.

Figure 5:
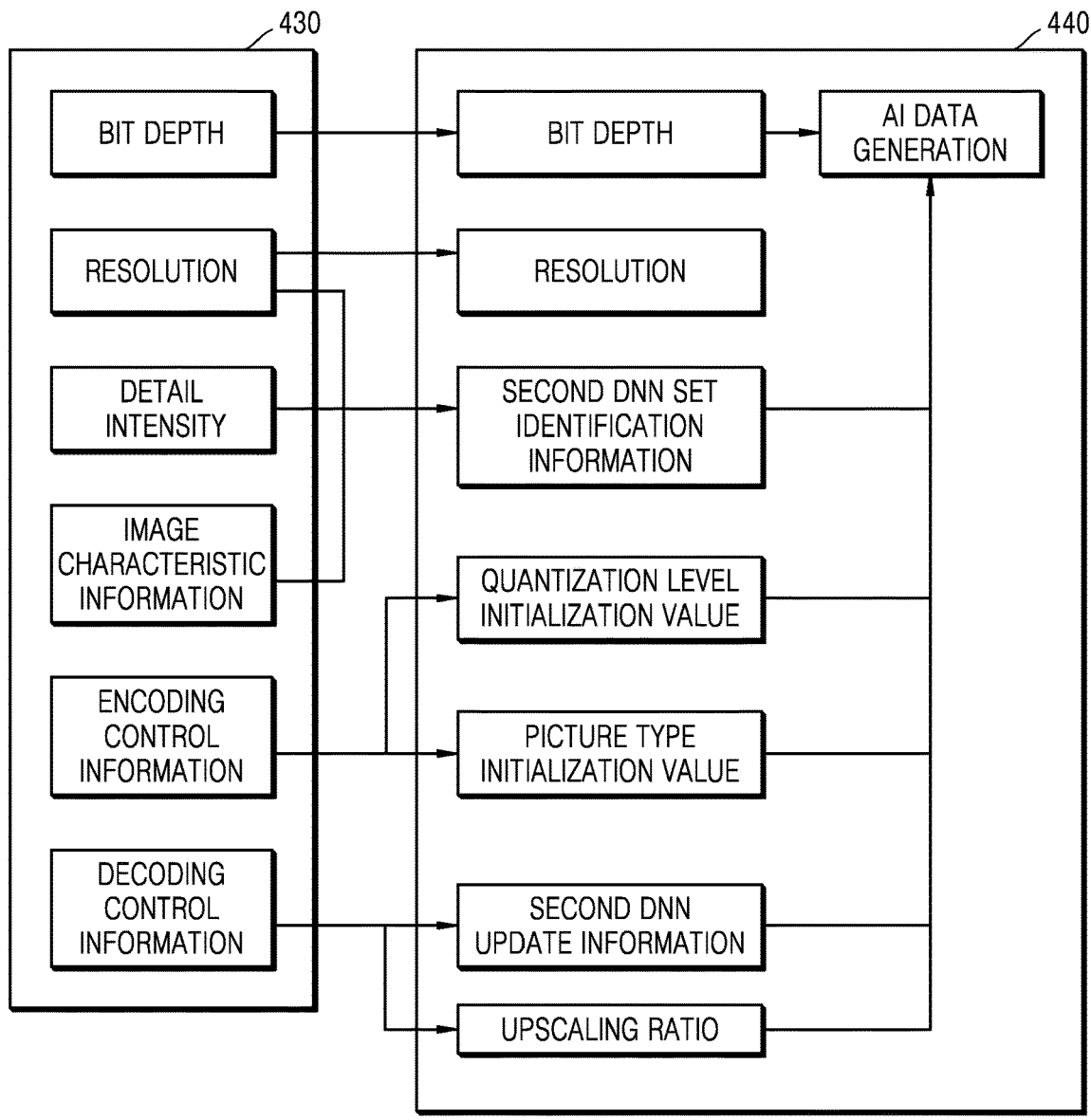
FIGS. 5 and 6 are diagrams used to describe an AI data setting controller and an AI data generator according to an embodiment.

For example, referring to FIG. 5, the AI data generator 440 may generate the second DNN set identification information, based on the target resolution of the first image, the target detail intensity, and the characteristic information of the original image. The AI data generator 440 may also generate the quantization level initialization value and the picture type initialization value, based on the encoding control information. The AI data generator 440 may determine the second DNN update information and the upscaling ratio, based on the decoding control information. However, embodiments are not limited thereto, and the AI data generator 440 may include various pieces of information enabling an AI up-scaler of the AI decoding apparatus 700 to AI-upscale the second image 135 to an upscaling target corresponding to the downscaling target.

The AI data generator 440 may transmit the generated AI data to the stream generator 450.

The stream generator 450 generates AI encoding data including the image data received from the encoder 420 and the AI data received from the AI data generator 440.

According to an embodiment, the stream generator 450 may generate AI encoding data including the image data and the AI data separate from each other. In this case, the AI encoding data may be in a container format such as MP4, AVI, MKV, or FLV, and the AI encoding data may be composed of a metadata box and a media data box.

For example, the media data box may include image data generated according to the syntax of a predetermined image compression method, and the metadata box may include information about the image data included in the media data box and the AI data according to an embodiment. The AI data may be encoded according to an encoding method provided in a predetermined container format and may be stored in the metadata box.

According to an embodiment, the stream generator 450 may generate AI encoding data such that the AI data is included in the image data. When the AI data is included in the image data, the AI data may be included in supplemental enhancement information (SEI) that is an additional information region of the image data.

The AI encoding data generated by the stream generator 450 is transmitted to the transmitter 460. The transmitter 460 may transmit the AI encoding data obtained as a result of the AI encoding through a network.

According to an embodiment, the AI encoding data may be stored in a data storage medium including a magnetic medium, for example a hard disk, a floppy disk, or a magnetic tape, an optical recording medium, for example CD-ROM or DVD, or a magneto-optical medium, for example a floptical disk.

Figure 7:
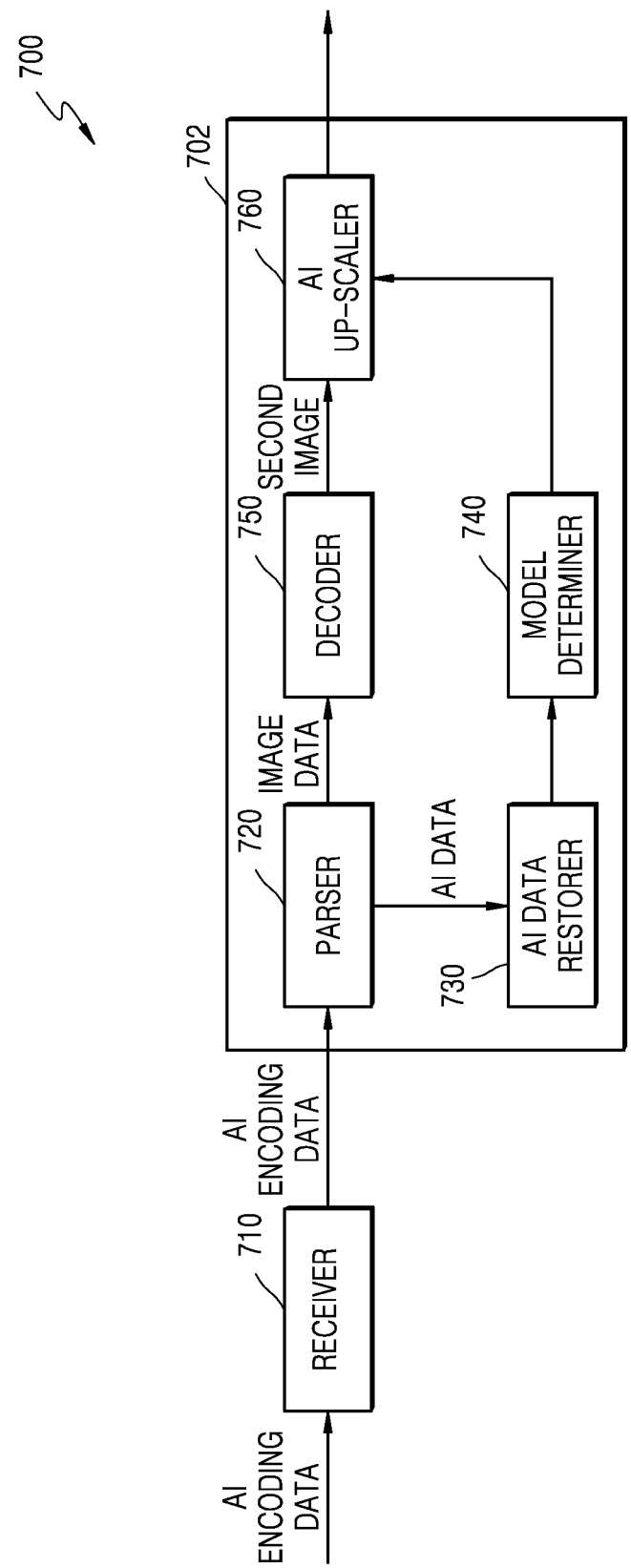
FIG. 7 is a block diagram of a structure of an AI decoding apparatus according to an embodiment.

FIG. 7 is a block diagram of a structure of an AI decoding apparatus 700 according to an embodiment of the disclosure.

Referring to FIG. 7, the AI decoding apparatus 700 may include a receiver 710 and an AI decoder 702. The AI decoder 702 may include a parser 720, a decoder 750, an AI data restorer 730, a model determiner 740, and an AI up-scaler 760.

In FIG. 7, the receiver 710 and the AI decoder 702 are illustrated as separate devices, but the receiver 710 and the AI decoder 702 may be implemented using one processor. In this case, the receiver 710 and the AI decoder 702 may be implemented using a dedicated processor or through a combination of software and a general-purpose processor such as an application processor (AP), a central processing unit (CPU), or a graphic processing unit (GPU). The dedicated processor may include a memory for implementing an embodiment of the disclosure or may include a memory processor for using an external memory.

The receiver 710 and the AI decoder 702 may be implemented using a plurality of processors. In this case, the receiver 710 and the AI decoder 702 may be implemented using a combination of dedicated processors or through a combination of software and a plurality of general-purpose processors such as an AP, a CPU, or a GPU. According to an embodiment, the receiver 710 may be implemented using a first processor, the decoder 750 may be implemented using a second processor different from the first processor, and the parser 720, the AI data restorer 730, the model determiner 740, and the AI up-scaler 760 may be implemented using a third processor different from the first and second processors.

The receiver 710 receives AI encoding data obtained as a result of AI encoding. For example, the AI encoding data may be a video file having a file format such as mp4 or mov.

The receiver 710 may receive AI encoding data transmitted through a network. The receiver 710 may output the AI encoding data to the AI decoder 702.

According to an embodiment, the AI encoding data may be obtained from a data storage medium including a magnetic medium, for a hard disk, a floppy disk, or a magnetic tape, an optical recording medium, for example, a CD-ROM or DVD, or a magneto-optical medium, for example, a floptical disk.

The parser 720 parses the AI encoding data to transmit image data obtained through encoding on the first image 115 to the decoder 750 and transmit AI data to the AI data restorer 730.

According to an embodiment, the parser 720 may parse the AI encoding data including the image data and the AI data separate from each other. The parser 720 may distinguish the AI data from the image data by reading a header within the AI encoding data.

According to another embodiment, the parser 720 may parse the AI encoding data to obtain image data, may extract AI data from the image data, and then may transmit the AI data to the AI data restorer 730 and the remaining image data to the decoder 750. In other words, the AI data may be included in the image data. For example, the AI data may be included in supplemental enhancement information (SEI) that is an additional information region of a bitstream corresponding to the image data.

According to another embodiment, the parser 720 may split the bitstream corresponding to the image data into a bitstream to be processed by the decoder 750 and a bitstream corresponding to the AI data, and may output the split two bitstreams to the decoder 750 and the AI data restorer 730, respectively.

The parser 720 may verify that the image data included in the AI encoding data is image data obtained using a predetermined codec, for example, MPEG-2, H.264, MPEG-4, HEVC, VC-1, VP8, VP9, or AV1. In this case, the parser 720 may transmit corresponding information to the decoder 750 such that the image data is processed using the verified codec.

The decoder 750 reconstructs the second image 135 corresponding to the first image 115, based on the image data received from the parser 720. The second image 135 obtained by the decoder 750 is provided to the AI up-scaler 760.

According to embodiments, decoding related information, such as prediction mode information, motion information, and quantization parameter information, may be provided by the parser 720 to the AI data restorer 730 or the model determiner 740. The decoding related information may be used to obtain second DNN setting information.

The AI data restorer 730 may extract pieces of information enabling the second image 135 to undergo AI upscaling, from the received AI data. An upscaling target of the second image 135 may correspond to a downscaling target of the first DNN 200. Accordingly, the AI data may include information for verifying the downscaling target of the first DNN 200.

Figure 8:
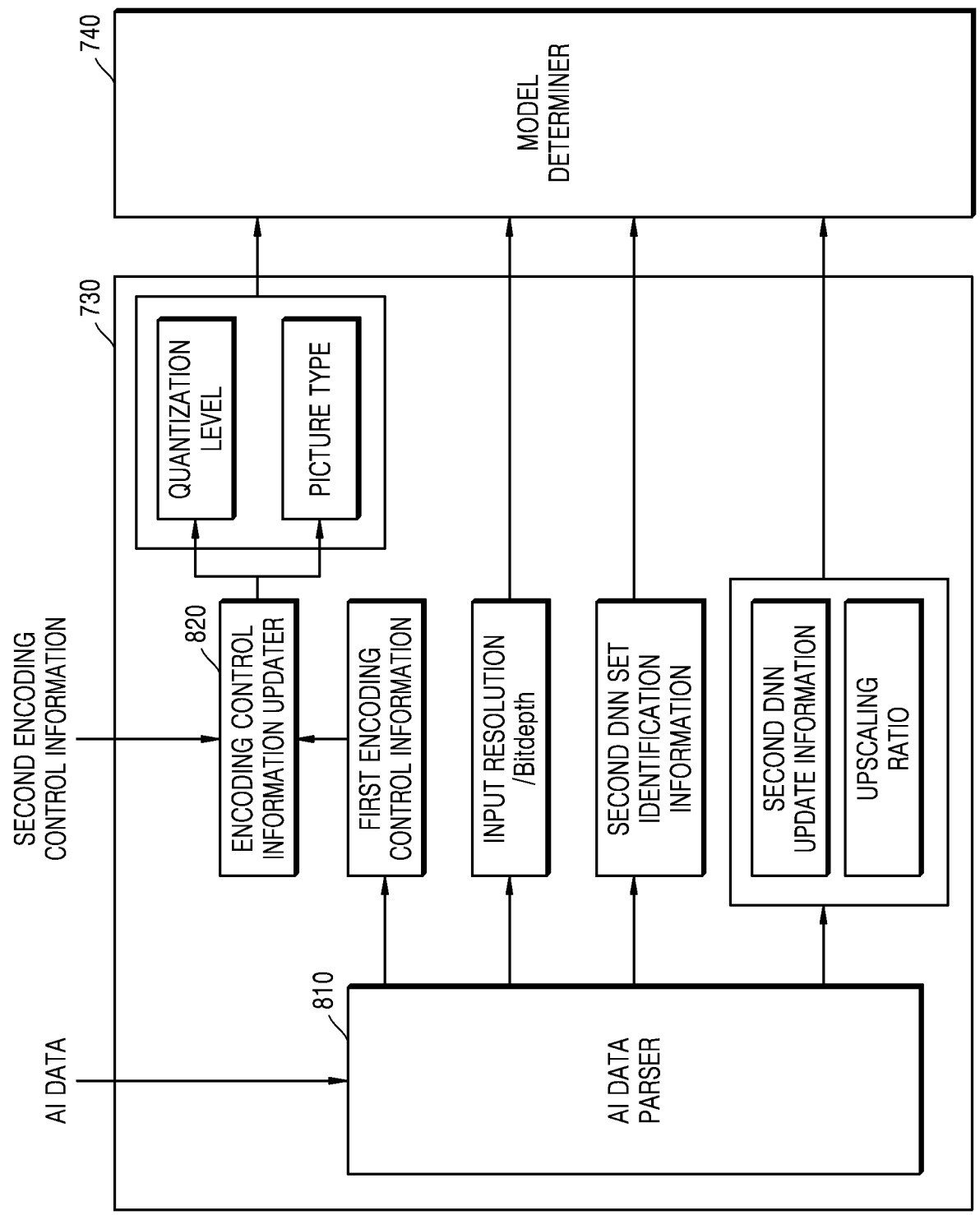
FIG. 8 is a diagram used to describe an AI data restorer and a model determiner according to an embodiment.

Referring to FIG. 8, the AI data restorer 730 may include an AI data parser 810 and an encoding control information updater 820.

The AI data parser 810 may parse the received AI data to obtain first encoding control information, resolution of the first image, a bit depth of the first image, second DNN set identification information, and decoding control information from the AI data.

When an operation method is predefined between the AI encoding apparatus 400 and an AI decoding apparatus 700 according to an embodiment, the AI data may not include picture type information from among the first encoding control information and the decoding control information, for example second DNN update information and an upscaling ratio.

The first encoding control information obtained from the AI data may include the picture type information and quantization level information, and the picture type information and quantization level information obtained from the AI data may be arbitrarily-set initial values.

The encoding control information updater 820 may obtain second encoding control information. The second encoding control information is information obtained from header information of the AI encoding data, for example, a bitstream, and thus may be actual encoding control information applied when encoding the first image. The encoding control information updater 820 may update the first encoding control information with the second encoding control information by comparing the first encoding control information with the second encoding control information.

The model determiner 740 may determine setting information of a second DNN that is to be used in AI upscaling, based on at least one of updated encoding control information, resolution information of the first image, bit depth information of the first image, second DNN set identification information, or decoding control information. The model determiner 740 may determine the upscaling target of the second image 135 at an upscaling ratio of the decoding control information. The upscaling target may indicate, for example, to what degree resolution is to be upscaled for the second image 135. When the AI data does not include the upscaling ratio, the model determiner 740 may determine the upscaling target of the second image 135 according to a predetermined output resolution.

According to an embodiment, the model determiner 740 may store a plurality of pieces of DNN setting information settable in the second DNN. Here, the DNN setting information may include information about at least one of the number of convolution layers included in the second DNN, the number of filter kernels for each convolution layer, or a parameter of each filter kernel.

The plurality of pieces of DNN setting information may respectively correspond to various upscaling targets, and the second DNN may operate based on DNN setting information corresponding to a specific upscaling target. The second DNN may have different structures based on the DNN setting information. For example, the second DNN may include three convolution layers according to any piece of DNN setting information, or may include four convolution layers according to another piece of DNN setting information.

According to an embodiment, the DNN setting information may only include a parameter of a filter kernel used in the second DNN. In this case, instead of merely the structure of the second DNN remaining unchanged, only the parameter of the internal filter kernel may change based on the DNN setting information.

The model determiner 740 may obtain the DNN setting information for performing AI upscaling on the second image 135, among the plurality of pieces of DNN setting information. Each of the plurality of pieces of DNN setting information used at this time is information for obtaining the third image 145 of a pre-determined output resolution and/or pre-determined quality, and is trained jointly with a first DNN.

For example, one piece of DNN setting information among the plurality of pieces of DNN setting information may include pieces of information for obtaining the third image 145 having a resolution twice as high as a resolution of the second image 135, for example, the third image 145 having a 4K resolution, for example 3840×2160, twice as high as a 2K resolution, for example 1920×1080, of the second image 135, and another piece of DNN setting information may include pieces of information for obtaining the third image 145 having a resolution four times higher than the resolution of the second image 135, for example, the third image 145 having a 4K resolution, for example 3840× 2160, four times as high as a 1K resolution, for example 960×540, of the second image 135.

Each of the plurality of pieces of DNN setting information is obtained jointly with DNN setting information of the first DNN of the AI encoding apparatus 400, and the model determiner 740 determines one piece of DNN setting information among the plurality of pieces of DNN setting information according to an enlargement ratio corresponding to a reduction ratio of the DNN setting information of the first DNN.

The model determiner 740 may verify information targeted by DNN setting information of the first DNN used to obtain the first image 115, and may obtain the DNN setting information of the second DNN trained jointly with the DNN setting information of the first DNN, by using pieces of information received from the AI encoding apparatus 400.

Figure 9:
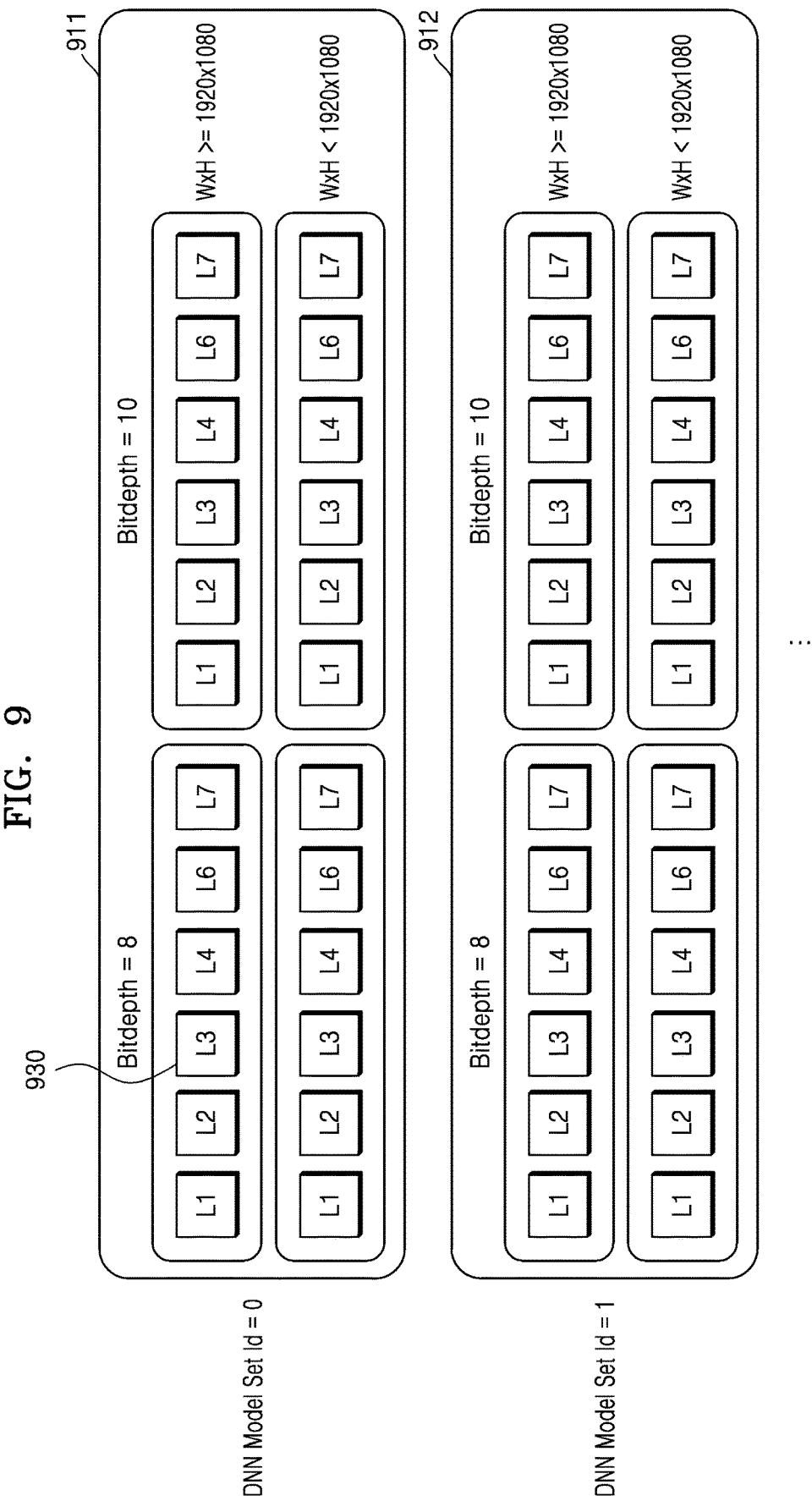
FIG. 9 illustrates an example in which the model determiner determines setting information of the second DNN that is to be used in AI upscaling.

FIG. 9 illustrates an example in which the model determiner 740 determines setting information of the second DNN that is to be used in AI upscaling.

Referring to FIG. 9, the model determiner 740 includes a plurality of pieces of DNN setting information. Each of the plurality of pieces of DNN setting information is determined through joint training with DNN setting information of the first DNN. The plurality of pieces of DNN setting information may be divided into a plurality of groups, and second DNN set identification information, for example DNN Model Set ID may be assigned to each of the groups. For example, the plurality of groups may include a first group 911 in which the second DNN set identification information is 0, and a second group 912 in which the second DNN set identification information is 1.

The model determiner 740 may select one from among the plurality of groups, based on the second DNN set identification information included in the AI data, and may determine one from among a plurality of pieces of DNN setting information included in the selected group, according to resolution information, a bit depth, and a quantization level.

For example, when the second DNN set identification information is 0, the model determiner 740 may select the first group 911, and, when the resolution is 1920×1080, the bit depth is 8, and the quantization level is L3, the model determiner 740 may select third setting information 930 from among a plurality of pieces of DNN setting information included in the first group 911.

The model determiner 740 may transmit the selected DNN setting information to the AI up-scaler 760, and input data may be processed based on the second DNN operating according to the DNN setting information.

When the upscaling target is determined, the AI up-scaler 760 performs AI upscaling on the second image 135 through a second DNN in order to obtain the third image 145 corresponding to the upscaling target.

When any one piece of DNN setting information is obtained, the AI up-scaler 760 may set the number of filter kernels and parameters of each filter kernel in each of the layers included in the second DNN as values included in the obtained DNN setting information, ad may AI-upscale the second image by using the set parameters.

FIG. 10 is a syntax table 1010 of AI data according to an embodiment of the disclosure.

Referring to FIG. 10, the AI data syntax table 1010 is an embodiment of an SEI syntax table for AI data transmission in a bitstream encoded according to a codec following the MPEG standard or the like.

The AI data syntax table 1010 includes elements related to second DNN information that is used in AI upscaling on the second image restored according to the image data.

According to the AI data syntax table 1010 of FIG. 10, input_picture_width_in_luma and input_picture_height_in_luma indicate width information of a downscaled input image, for example a first image and height information of the downscaled input image, respectively. For example, input_picture_width_in_luma and input_picture_height_in_luma are pieces of information related to the resolution of the downscaled input image. input_bit_depth indicates a bit depth of the downscaled input image, and input_bit_depth may be 8 or 10. dnn_model_update_type is information related to second DNN update. quantization_level indicates a quantization level of an input video stream, and an initial value of the quantization level may be, but is not limited to, 12. picture_type is a value related to an encoding control method, and indicates one of I, P, and B. up_scaling_factor is information indicating an upscaling factor. dnn_model_set_index indicates mutually-agreed second DNN set identification information that is used in AI upscaling.

The model determiner 740 may determine, as setting information of the second DNN 300, one from among a plurality of pre-stored pieces of setting information for AI upscaling, based on the elements included in an AI data syntax table.

FIG. 11 is a syntax table 1110 of AI data according to another embodiment of the disclosure.

The AI data syntax table 1110 includes elements related to second DNN information that is used in AI upscaling on the second image restored according to the image data.

input_picture_width_in_luma, input_picture_height_in_luma, input_bit_depth, quantization_level, dnn_model_set_index have been described above with reference to FIG. 10, and thus descriptions thereof will be omitted.

The AI data syntax table 1110 of FIG. 11 may not include dnn_model_update_type, picture_type and up_scaling_factor included in the AI data syntax table 1010 of FIG. 10.

The model determiner 740 may determine, as setting information of the second DNN, one from among a plurality of pre-stored pieces of setting information for AI upscaling, based on the elements included in an AI data syntax table.

Figure 12:
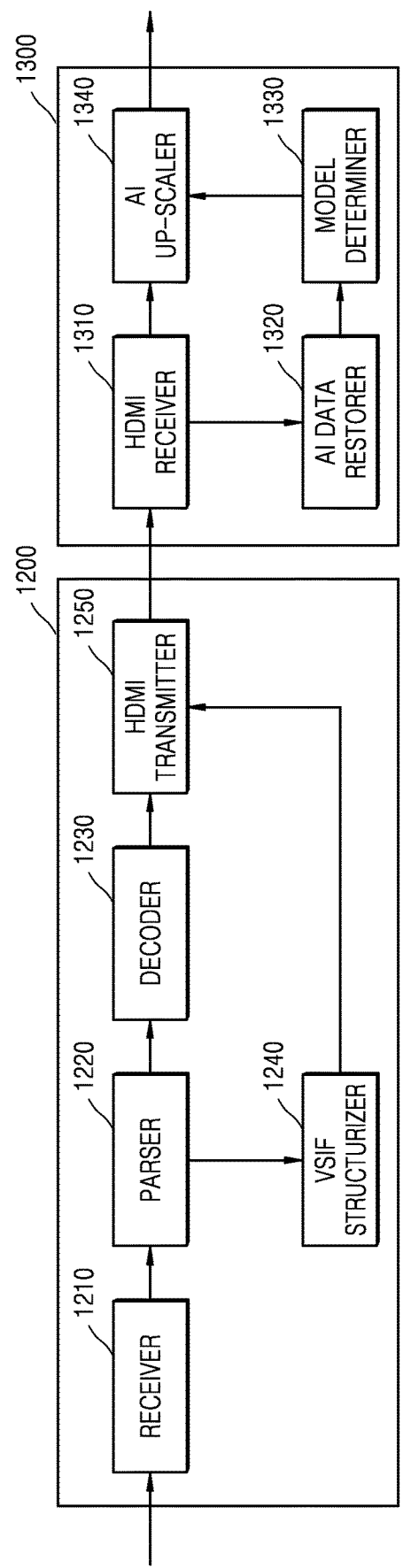
FIG. 12 illustrates an example in which an AI decoding apparatus according to an embodiment includes a decoding apparatus and an AI upscaling apparatus separate from each other.

FIG. 12 illustrates an example in which an AI decoding apparatus according to an embodiment of the disclosure includes a decoding apparatus 1200 and an AI upscaling apparatus 1300 separate from each other.

The decoding apparatus 1200 and the AI upscaling apparatus 1300 may be connected to each other through a High-Definition Multimedia Interface (HDMI) cable. When an HDMI transmitter 1250 of the decoding apparatus 1200 and an HDMI receiver 1310 of the AI upscaling apparatus 1300 are connected to each other through the HDMI cable, four channels that provide a TMDS data channel and a TMDS clock channel may be paired. The TMDS data channel includes three data transmission channels, and may be used to transmit video data, audio data, and additional data. At this time, a packet structure is used to transmit the audio data and the additional data through the TMDS data channel.

An HDMI transmitter 1250 of the decoding apparatus 1200 and an HDMI receiver 1310 of the AI upscaling apparatus 1300 may provide a display data channel (DDC). The DDC is a protocol standard for digital information transmission between a monitor and a computer adapter defined in Video Electronics Standard Association (VESA). The DDC is used in a structure and state information exchange between one source apparatus, for example, a decoding apparatus, and one sink apparatus (for example, an AI upscaling apparatus).

Referring to FIG. 12, the decoding apparatus 1200 may include a receiver 1210, a parser 1220, a decoder 1230, a vendor specific infoframe (VSIF) structurizer 1240, and an HDMI transmitter 1250.

The receiver 1210, the parser 1220, and the decoder 1230 of FIG. 12 correspond to the receiver 710, the parser 720, and the decoder 750 of FIG. 7, respectively, and thus detailed descriptions thereof will be omitted.

The VSIF structurizer 1240 may structurize AI data transmitted by the parser 1220, in the form of a VSIF packet.

The VSIF structurizer 1240 may generate a VSIF packet corresponding to each of a plurality of frames. For example, when the AI data is received once for the plurality of frames, the VSIF structurizer 1240 may generate the VSIF packet corresponding to each of the plurality of frames, by using the once-received AI data. For example, the VSIF packets respectively corresponding to the plurality of frames may be generated based on the same AI data.

On the other hand, when the AI data is received several times for the plurality of frames, the VSIF structurizer 1240 may generate a new VSIF packet by using newly-received AI data.

VSIF packets generated by the VSIF structurizer 1240 will now be described in detail with reference to FIGS. 13 and 14.

FIG. 13 illustrates a header structure and a content structure of a VSIF packet, according to an embodiment of the disclosure.

Referring to FIG. 13, the VSIF packet includes a VSIF packet header 1410 and a VSIF packet content 1420. The VSIF packet header 1410 may include 3 bytes, wherein a first byte HB0 is a value indicating a type, a type value of VSIF is expressed as 0x01, a second byte HB1 indicates version information, the version of VSIF is expressed as 0x01, and lower five bits 0 through 4 of a third byte HB2 indicate a content length of the VSIF packet.

The VSIF structurizer 1240 may structurize AI data in the form of a VSIF packet. For example, the VSIF structurizer 1240 may generate the VSIF packet such that the AI data is included in the VSIF packet content 1420.

The VSIF structurizer 1240 may determine a packet byte for describing AI data according to the amount of the AI data. The VSIF structurizer 1240 may generate a VSIF packet content such that the AI data described above with reference to FIG. 10 is described in fifth through eighteenth packet bytes PB4 through PB17 included in the VSIF packet content.

For example, the VSIF structurizer 1240 may define input_picture_width_in_luma by using PB05 and PB06, and may define input_picture_height_in_luma by using PB07 and PB08. input_picture_width_in_luma and input_picture_height_in_luma indicate a resolution of the downscaled first image.

The VSIF structurizer 1240 may define input_bit_depth by using PB09. input_bit_depth indicates a bit depth of the first image.

The VSIF structurizer 1240 may define quantization_level by using PB10. quantization_level indicates a quantization level of an input video stream.

The VSIF structurizer 1240 may define dnn_model_set_index by using PB11 and PB12. dnn_model_set_index indicates mutually-agreed second DNN set identification information that is used in AI upscaling.

However, embodiments of the disclosure are not limited thereto. The VSIF structurizer 1240 may structurize the AI data in the form of a VSIF packet by using various methods.

FIG. 14 illustrates a header structure and a content structure of a VSIF packet, according to another embodiment of the disclosure.

A VSIF packet header 1415 of FIG. 14 may be configured the same as the VSIF packet header 1410 of FIG. 13.

The VSIF structurizer 1240 may generate a VSIF packet content such that the AI data described above with reference to FIG. 11 is described in fifth through eighteenth packet bytes PB4 through PB17 included in the VSIF packet content. The AI data of FIG. 14 may further include dnn_model_update_type, picture_type, and up_scaling_factor included in the AI data of FIG. 11.

Accordingly, the VSIF structurizer 1240 may define input_picture_width_in_luma by using PB05 and PB06, and may define input_picture_height_in_luma by using PB07 and PB08. input_picture_width_in_luma and input_picture_height_in_luma indicate a resolution of the downscaled first image.

The VSIF structurizer 1240 may define picture_type by using bits 1 and 2 of PB13, and picture_type is a value related to an encoding control method and indicates I, P, or B.

The VSIF structurizer 1240 may define dnn_model_update_type by using bits 3 and 4 of PB13, and dnn_model_update_type indicates information related to AI upscaling neural network model update.

The VSIF structurizer 1240 may define input_bit_depth by using bits 5 through of PB13. input_bit_depth indicates a bit depth of the first image.

The VSIF structurizer 1240 may define quantization_level by using PB14. quantization_level indicates a quantization level of an input video stream.

The VSIF structurizer 1240 may define up_scaling_factor by using PB15. up_scaling_factor indicates an upscaling factor.

The VSIF structurizer 1240 may define dnn_model_set_index by using PB16 and PB17. dnn_model_set_index indicates mutually-agreed second DNN set information that is used in AI upscaling.

However, embodiments of the disclosure are not limited thereto. The VSIF structurizer 1240 may structurize the AI data in the form of a VSIF packet by using various methods.

Structures of the VSIF packets of FIGS. 13 and 14 are merely examples, and thus embodiments of the disclosure are not limited thereto. As necessary, locations or sizes of fields that define AI data included in the VSIF packets of FIGS. 13 and 14 may be changed, and additional data may be further included in the VSIF packets.

Referring back to FIG. 12, the VSIF structurizer 1240 may transmit the generated VSIF packet to the HDMI transmitter 1250, and the HDMI transmitter 1250 may transmit the VSIF packet to the AI upscaling apparatus 1300 through a TMDS channel.

The HDMI transmitter 1250 may transmit the second image received from the decoder 1230 to the AI upscaling apparatus 1300 through the TMDS channel.

The AI upscaling apparatus 1300 may include the HDMI receiver 1310, an AI data restorer 1320, a model determiner 1330, and an AI up-scaler 1340.

The AI upscaling apparatus 1300 may store extended display identification data (EDID) information. The EDID information is a data structure including various pieces of information about an AI upscaling apparatus, and may be transmitted to the decoding apparatus 1200 using a DDC channel.

The EDID information may include information about an AI upscaling capability of the AI upscaling apparatus 1300. For example, the EDID information may include information about whether the AI upscaling apparatus 1300 is able to perform AI upscaling.

The HDMI receiver 1310 of the AI upscaling apparatus 1300 may receive the AI data structurized in the form of a VSIF packet and the second image through the TMDS channel.

The HDMI receiver 1310 of the AI upscaling apparatus 1300 may search for the VSIF packet by checking header information of an HDMI packet, and then determine whether the VSIF packet includes the AI data.

For example, the HDMI receiver 1310 may determine whether the received HDMI packet is a VSIF packet, by checking whether the first byte HB0 representing a packet type from among the header information of the received HDMI packet is 0x01. When it is determined that the HDMI packet is a VSIF packet, the HDMI receiver 1310 may also determine whether the AI data is included in the VSIF packet content.

For example, the HDMI receiver 1310 may obtain the AI data by using bit values included in the VSIF packet content. For example, the AI data restorer 1320 may obtain the resolution information of the first image by using PB05 through PB08 of the VSIF packet content.

The AI data restorer 1320 may obtain the bit depth of the first image by using PB09 or bits 4 through 7 of PB13, and may obtain the quantization level information by using PB14 or PB10. The AI data restorer 1320 may also obtain the second DNN set identification information by using PB16 and PB17 or by using PB11 and PB12.

In embodiments, the AI data restorer 1320 may obtain the picture type information by using bits 0 and 1 of PB13, and may obtain the second DNN update information by using bits 2 and 3 of PB13.

The AI data restorer 1320 may provide the AI data obtained from the VSIF packet content to the model determiner 1330, and the model determiner 1330 may determine, as setting information of the second DNN, one from among a plurality of pre-stored pieces of setting information for AI upscaling, based on the obtained AI data.

The HDMI receiver 1310 may provide the received second image to the AI up-scaler 1340, and the AI up-scaler 1340 may set parameters of the second DNN by using the determined DNN setting information, and may AI-upscale the second image by using the set parameters.

In FIGS. 12 through 14, the decoding apparatus 1200 and the AI upscaling apparatus 1300 are connected to each other using the HDMI cable. However, embodiments of the disclosure are not limited thereto, and a decoding apparatus and an AI upscaling apparatus according to an embodiment of the disclosure are connected to each other using a display port (DP) cable. When the decoding apparatus and the AI upscaling apparatus are connected to each other using a DP cable, the decoding apparatus may transmit a second image and AI data to the AI upscaling apparatus through a DP, similar to an HDMI method.

The decoding apparatus 1200 may transmit the second image and the AI data to the AI upscaling apparatus 1300 through an input/output interface other than an HDMI and a DP.

The decoding apparatus 1200 may transmit the second image and the AI data to the AI upscaling apparatus 1300 through different interfaces. For example, the decoding apparatus 1200 may transmit the second image to the AI upscaling apparatus 1300 through an HDMI cable and the AI data to the AI upscaling apparatus 1300 through a DP cable. As another example, the decoding apparatus 1200 may transmit the second image to the AI upscaling apparatus 1300 through a DP cable and the AI data to the AI upscaling apparatus 1300 through an HDMI cable.

Figure 15:
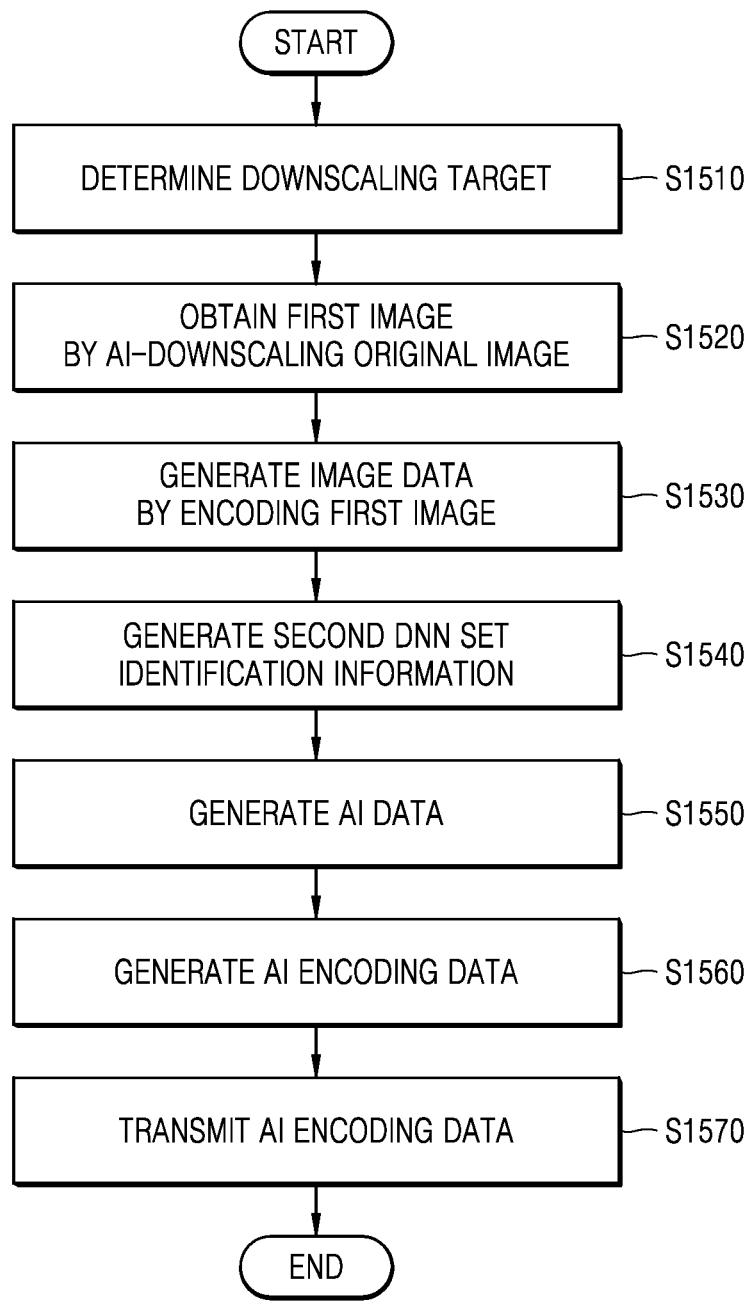
FIG. 15 is a flowchart of an operation method of an AI encoding apparatus, according to an embodiment.

FIG. 15 is a flowchart of an operation method of an AI encoding apparatus, according to an embodiment of the disclosure.

Referring to FIG. 15, in operation S1510, the AI encoding apparatus 400 may determine a downscaling target. For example, the AI encoding apparatus 400 may determine a downscaling ratio, based on a target resolution of a first image.

The AI encoding apparatus 400 may obtain DNN setting information corresponding to the downscaling ratio, and may set parameters of a first DNN by using the obtained DNN setting information. In operation S1520, the AI encoding apparatus 400 may obtain the first image by AI-downscaling an original image through the first DNN set with the parameters.

In operation S1530, the AI encoding apparatus 400 may generate image data by encoding the first image.

The AI encoding apparatus 400 may obtain one or more pieces of input information for setting AI data. For example, the AI encoding apparatus 400 may obtain a target resolution of the first image, a bit depth of the first image, characteristic information of the original image, for example the input image, a target detail intensity, encoding control information, decoding control information, and the like. The one or more pieces of input information may include information pre-stored in the AI encoding apparatus 400 or information received from a user. The AI encoding apparatus 400 may determine the quality of the original image by using an image quality measurement network, and the target detail intensity may be determined based on quality information of the original image.

In operation S1540, the AI data generator 440 may generate second DNN set identification information, based on the target resolution of the first image, the target detail intensity, and the characteristic information of the original image.

In operation S1550, the AI encoding apparatus 400 may generate the AI data, based on the obtained input information. The AI data according to an embodiment of the disclosure may include at least one of the resolution of the first image, the bit depth of the first image, the second DNN set identification information, a quantization level initialization value, a quantization parameter initialization value, a picture type initialization value, second DNN update information, or an upscaling ratio.

The AI encoding apparatus 400 may generate AI encoding data including the image data and the AI data, in operation S1560, and may transmit the AI encoding data to the AI decoding apparatus 700, in operation S1570.

Figure 16:
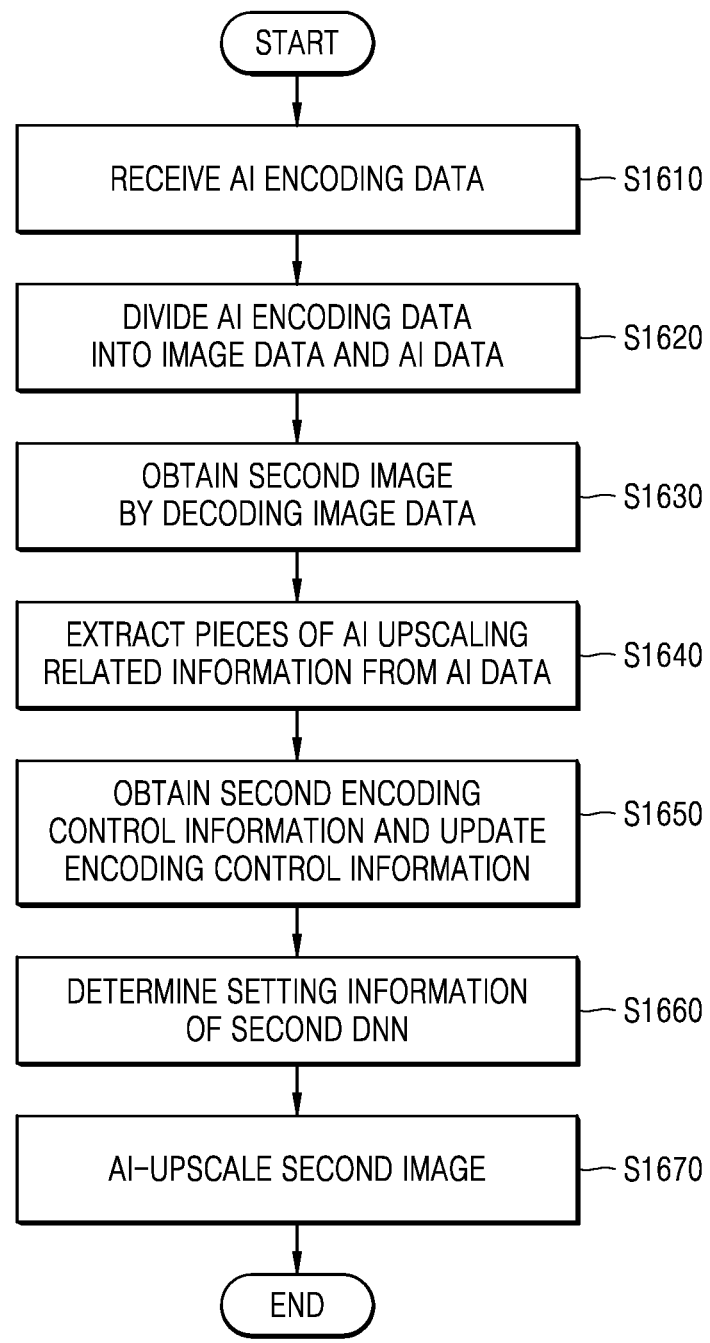
FIG. 16 is a flowchart of an operation method of an AI decoding apparatus, according to an embodiment.

FIG. 16 is a flowchart of an operation method of an AI decoding apparatus, according to an embodiment of the disclosure.

Referring to FIG. 16, in operation S1610, the AI decoding apparatus 700 may receive the AI encoding data. The receive AI encoding data may include the image data and the AI data.

In operation S1620, the AI decoding apparatus 700 may divide the AI encoding data into the image data and the AI data. For example, the AI decoding apparatus 700 may distinguish the AI data from the image data by reading a header within the AI encoding data. In embodiments, the AI decoding apparatus 700 may extract the AI data included in an SEI that is an additional information region of a bitstream corresponding to the image data.

In operation S1630, the AI decoding apparatus 700 may obtain a second image by decoding the image data.

In operation S1640, the AI decoding apparatus 700 may extract pieces of AI upscaling related information enabling the second image to be AI-upscaled, from the AI data. For example, the AI decoding apparatus 700 may extract the resolution of the first image, the bit depth of the first image, the second DNN set identification information, and first encoding control information. The first encoding control information may include picture type information and quantization level information, and the picture type information and the quantization level information included in the first encoding control information may be arbitrarily-set initial values.

In operation S1650, the AI decoding apparatus 700 may obtain second encoding control information that is actual encoding control information applied when encoding the first image, and may update the first encoding control information with the second encoding control information by comparing the first encoding control information with the second encoding control information.

In operation S1660, the AI decoding apparatus 700 may determine setting information of a second DNN that is to be used in AI upscaling, based on at least one of updated encoding control information, resolution information of the downscaled first image, bit depth information of the first image, second DNN set identification information, or decoding control information. For example, the AI decoding apparatus 700 may obtain DNN setting information corresponding to the upscaling ratio, and may set parameters of the second DNN by using the obtained DNN setting information.

In operation S1670, the AI decoding apparatus 700 may AI-upscale the second image by using the set parameters.

An operation method of an AI encoding apparatus and an operation method of an AI decoding apparatus, according to an embodiment, may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments or may be well-known to and be usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a RAM, or a flash memory. Examples of the program commands are advanced language codes that can be executed by a computer by using an interpreter or the like as well as machine language codes made by a compiler.

Also, the operation method of an AI encoding apparatus and the operation method of an AI decoding apparatus, according to the disclosed embodiments, may be provided in a computer program product. The computer program product may be traded as a commodity between a seller and a purchaser.

The computer program product may include a software program and a computer-readable storage medium having the software program stored thereon. For example, the computer program product may include a product in the form of a software program (e.g., a downloadable app) that is electronically distributed through the manufacturer of an electronic device or an electronic market (e.g., Google Play Store, AppStore). For electronic distribution, at least a portion of the software program may be stored on a storage medium or may be created temporarily. In this case, the storage medium may be a server of a manufacturer, a server of an electronic market, or a storage medium of a relay server for temporarily storing an SW program.

The computer program product may include, in a system including a server and a client device, a storage medium of the server or a storage medium of the client device. In embodiments, if there is a third device (e.g., a smartphone) in communication with the server or client device, the computer program product may include a storage medium of the third device. Alternatively, the computer program product may include the S/W program itself transmitted from the server to the client device or the third device, or transmitted from the third device to the client device.

In this case, one of the server, the client device, and the third device may execute the computer program product to perform the methods according to the disclosed embodiments. Alternatively, at least two of the server, the client device, and the third device may execute the computer program product to distribute and perform the methods according to the disclosed embodiments.

For example, a server (e.g., a cloud server or an artificial intelligence server) may execute a computer program product stored on a server to control a client device communicating with the server to perform the methods according to the disclosed embodiments.

An AI encoding apparatus according to an embodiment of the disclosure transmits AI data including information related to a neural network for use in AI upscaling together with AI-downscaled and encoded image data to an AI decoding apparatus according to an embodiment, and the AI decoding apparatus sets parameters of the AI-upscaling neural network, based on the received AI data, thereby improving the quality of a restored image.

While one or more embodiments of the disclosure have been described with reference to the figures, it will be understood by those of ordinary skill in the art that various changes in form and details may be made therein without departing from the spirit and scope as defined by the following claims.

The invention claimed is:

1. An artificial intelligence (AI) encoding apparatus comprising:
at least one processor configured to:
determine quality information of an original image by using a quality measurement network,
select a target detail intensity according to the quality information of the original image, determine a downscaling target, based on a target resolution of a first image, obtain the first image by AI-downscaling the original image using an AI-downscaling neural network corresponding to the downscaling target, generate image data by encoding the first image, select AI-upscaling neural network set identification information, based on the target resolution of the first image, characteristic information of the original image, and the target detail intensity, generate AI data including the target resolution of the first image, bit depth information of the first image, the AI-upscaling neural network set identification information, and encoding control information, and generate AI encoding data including the image data and the AI data; and a communication interface configured to transmit the AI encoding data to an AI decoding apparatus, wherein the AI data includes information about an AI-upscaling neural network corresponding to the AI-downscaling neural network.

2. The AI encoding apparatus of claim 1, wherein the quality information indicates at least one of a high quality, a low quality, or a noisy quality, and wherein the quality measurement network is configured to:

extract a feature representing at least one of a detail, noise, or contrast of the original image, and determine the quality information based on the extracted feature.

3. The AI encoding apparatus of claim 1, wherein the AI data further includes decoding control information comprising an updating method of the AI-upscaling neural network and an AI upscaling ratio.

4. The AI encoding apparatus of claim 1, wherein the encoding control information comprises at least one of a quantization level or a picture type, wherein the quantization level is determined as a preset first value, and wherein the picture type is determined as an intra (I) picture, a predictive (P) picture, or a bidirectional (B) picture.

5. The AI encoding apparatus of claim 1, wherein the AI encoding data further includes a metadata box and a media data box, wherein the AI data is included in the metadata box, and wherein the image data is included in the media data box.

6. The AI encoding apparatus of claim 1, wherein the AI data is included in supplemental enhancement information (SEI) that is an additional information area of the image data.

7. An artificial intelligence (AI) decoding apparatus comprising:

a communication interface configured to receive AI encoding data generated by AI-downscaling and encoding an original image; and at least one processor configured to:

divide the AI encoding data into image data and AI data, obtain a second image corresponding to a first image obtained by AI-downscaling the original image, by decoding the image data, extract a resolution of the first image, bit depth information of the first image, AI-upscaling neural network set identification information, and first encoding control information from the AI data, obtain second encoding control information used to encode the first image, update the first encoding control information based on the second encoding control information, select an AI-upscaling neural network, based on a resolution of the original image, bit depth information of the original image, the AI-upscaling neural network set identification information, and the second encoding control information, and AI-upscale the second image using the selected AI-upscaling neural network, wherein the AI-upscaling neural network set identification information is selected based on a target detail intensity that is selected based on quality information of the original image determined using a quality measurement network.

8. The AI decoding apparatus of claim 7, wherein the first encoding control information includes an initial value of a preset quantization level, and wherein the second encoding control information includes a quantization level value applied to encode the first image.

9. The AI decoding apparatus of claim 8, wherein the at least one processor is further configured to:

select a piece of neural network setting information from among a plurality of pieces of neural network setting information corresponding to the AI-upscaling neural network set identification information, according to the resolution of the first image, the bit depth information of the first image, and the quantization level value included in the second encoding control information, and set parameters of the AI-upscaling neural network based on the selected piece of neural network setting information.

10. The AI decoding apparatus of claim 7, wherein the at least one processor is further configured to:

determine update information of the AI-upscaling neural network and an upsampling ratio from the AI data, and AI-upscale the second image, based on the selected AI-upscaling neural network, the update information, and the upsampling ratio.

11. An operation method of an artificial intelligence (AI) encoding apparatus, the operation method comprising:

determining quality information of an original image by using a quality measurement network; and selecting a target detail intensity according to the quality information of the original image;

determining a downscaling target, based on a target resolution of a first image;

obtaining the first image by AI-downscaling the original image using an AI-downscaling neural network corresponding to the downscaling target;

generating image data by encoding the first image;

selecting AI-upscaling neural network set identification information, based on the target resolution of the first image, characteristic information of the original image, and the target detail intensity;

generating AI data including the target resolution of the first image, bit depth information of the first image, the AI-upscaling neural network set identification information, and encoding control information;

generating AI encoding data including the image data and the AI data; and transmitting the AI encoding data to an AI decoding apparatus, wherein the AI data represents information about an AI-upscaling neural network corresponding to the AI-downscaling neural network.

12. The operation method of claim 11, wherein the quality information indicates at least one of a high quality, a low quality, or a noisy quality, and
wherein the quality measurement network is configured to extract a feature representing at least one of a detail, noise, or contrast of the original image, and determine the quality information based on the extracted feature.

13. The operation method of claim 11, wherein the AI data further includes decoding control information comprising an updating method of the AI-upscaling neural network and an AI upscaling ratio.

14. The AI encoding apparatus of claim 1, wherein based on the image quality information indicating a first image quality, the target detail intensity is selected to be a first target detail intensity, and
wherein based on the image quality information indicating a second image quality that is lower than the first image quality, the target detail intensity is determined to be a second target detail intensity that is stronger than the first target detail intensity.

* * * * *